United States Patent
Seberger et al.

(10) Patent No.: US 8,193,784 B2
(45) Date of Patent: *Jun. 5, 2012

(54) BIDIRECTIONAL DC TO DC CONVERTER FOR POWER STORAGE CONTROL IN A POWER SCAVENGING APPLICATION

(75) Inventors: Stephen G. Seberger, Marshalltown, IA (US); Adam J. Wittkop, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 1009 days.

This patent is subject to a terminal disclaimer.

(21) Appl. No.: 12/139,321

(22) Filed: Jun. 13, 2008

(65) Prior Publication Data
US 2008/0310195 A1    Dec. 18, 2008

Related U.S. Application Data

(60) Provisional application No. 60/944,451, filed on Jun. 15, 2007, provisional application No. 60/944,454, filed on Jun. 15, 2007.

(51) Int. Cl.
*G05F 1/00* (2006.01)
*G05F 1/613* (2006.01)
*G05F 3/16* (2006.01)

(52) U.S. Cl. ........................ 323/222; 323/224
(58) Field of Classification Search .......... 323/222, 323/224; 363/16
See application file for complete search history.

(56) References Cited

U.S. PATENT DOCUMENTS

| | | | | |
|---|---|---|---|---|
| 4,743,812 | A * | 5/1988 | Dishner | 318/14 |
| 6,320,358 | B2 * | 11/2001 | Miller | 323/222 |
| 6,590,370 | B1 | 7/2003 | Leach | |
| 2005/0052165 | A1 | 3/2005 | Willner et al. | |
| 2005/0088865 | A1 * | 4/2005 | Lopez et al. | 363/132 |

FOREIGN PATENT DOCUMENTS
WO    WO-03/021757    3/2003

OTHER PUBLICATIONS
International Search Report for PCT/US2008/066968, dated Sep. 23, 2008.

* cited by examiner

*Primary Examiner* — Jue Zhang
(74) *Attorney, Agent, or Firm* — Marshall, Gerstein & Borun LLP

(57) ABSTRACT

A bidirectional DC to DC converter having a first operational mode and a second operational mode includes a first terminal pair that has a positive terminal and a negative terminal and that connects the converter to a first electric circuit, a second terminal pair that has a positive terminal and a negative terminal and that connects the converter to a second electric circuit, an accumulation element for temporary accumulation of electric energy; and a switching circuit connected to the first terminal pair, the second terminal pair, and the accumulation element. Electric energy is transferred from the first electric circuit to the second electric circuit via the accumulation element in the first operational mode of the bidirectional DC to DC converter and, from the second electric circuit to the first electric circuit via the accumulation element in the second operational mode of the DC to DC converter.

26 Claims, 15 Drawing Sheets

BIDIRECTIONAL DC TO DC CONVERTER FOR POWER STORAGE CONTROL IN A POWER SCAVENGING APPLICATION

CROSS-REFERENCE TO RELATED APPLICATIONS

This application claims benefit of the following U.S. Provisional Applications: Ser. No. 60/944,451, entitled "Bidirectional DC to DC Converter for Power Storage Control in a Power Scavenging Application" filed Jun. 15, 2007 and Ser. No. 60/944,454, entitled "Input Regulated DC to DC Converter for Power Scavenging" filed Jun. 15, 2007, the disclosures of which are hereby expressly incorporated herein by reference.

FIELD OF THE INVENTION

The present invention relates generally to voltage and power conversion circuits and, more particularly, to a method and apparatus for transferring energy between a primary electrical circuit and a secondary electrical circuit.

DESCRIPTION OF THE RELATED ART

DC to DC converters are used in a variety of applications to produce regulated voltage. Some converters, known as step-up or "boost" converters, generate voltage at the output terminals which is higher than the input voltage. Conversely, step-down or "buck" converters generate lower voltage at the output terminals. The DC to DC converters known in the art typically operate by controlling, through dedicated switching circuitry, the timing and the direction of current flowing through an inductor. In particular, DC to DC converters cyclically vary the periods of time during which an inductor accumulates and then releases electrical energy in response to the voltage detected by a feedback circuit at the output terminals of the converter. Because the operation of a typical DC to DC converter depends on the output voltage only, the converter takes as much power as necessary from the input terminals in order to produce regulated voltage at the output terminals. For example, in order to provide constant voltage to a load, a typical DC to DC converter will draw more or less power from the input terminals depending on the demands of the load.

One known application of DC to DC converters is in the circuitry of power scavenging devices. In many industrial and household applications, a current loop consisting of a source and one or more consumers of electrical power includes additional circuitry for redirecting some of the power from the current loop to a secondary load. The process of harvesting power from a primary circuit is usually referred to as "scavenging" and the circuitry required to perform this operation is accordingly referred to as a "power scavenging device." Typically, a scavenging device targets excess or unused electrical power from a primary circuit in order to power a smaller load.

Importantly, the application of scavenging device is not limited to electrical circuits. For example, power may come from such source as solar radiation or physical vibration. In short, various forms of electromagnetic or mechanical energy may be scavenged and saved as electrical power.

Scavenging devices may be used, for example, in 4-20 mA current loops which are widely used in the process control industry to propagate analog signals between field devices and a Distributed Control System, or DCS. Generally speaking, field devices, such as valves, valve positioners, or switches, process control signals by detecting DC current in the 4-20 mA range. Similarly, field devices responsible for taking measurements of process parameters, such as pressure, flow, or temperature sensors, generate signals in the 4-20 mA range and propagate these signals to a DCS over a dedicated pair of wires. In some cases, it may be desirable to use some of the power in the 4-20 mA loop to power an additional device, such as radio transceiver, for example. At the same time, it is desirable to limit the voltage drop across a scavenging circuit drawing power from a 4-20 mA loop so that the scavenging circuit does not interfere with the current loop, and, more specifically, with the signaling between a DCS and a field device.

Because a variable current loop may be able to supply more energy than needed to power a scavenger-powered load, it is also desirable to harvest some of the excess power and save this excess power on a storage device. Additionally, it is desirable to have the means to draw the power back from the power storage when the current loop supplies less energy that is required to operate a scavenger-powered load. In other words, it is desirable to step up the voltage supplied to a power storage and step down the voltage supplied from the power supply to the scavenger powered load. Moreover, because the voltage across both the power storage terminals and the power load terminals may vary with time, a DC to DC converter is needed. One skilled in the art will further appreciate that this relationship may be reversed in some applications and voltage would need to be raised and lowered in the opposite directions between a power storage and a scavenger-powered load.

In order to meet this objective by using the available technology, the corresponding circuitry would require at least two DC to DC converters. In particular, at least one buck (or step-down) converter and at least one boost (or step-up) converter would be required to properly regulate power transfer between two circuits with varying energy requirements and availability. Clearly, using multiple DC to DC increases the complexity, the cost, and the footprint of a circuit. Moreover, conventional DC to DC converters output constant voltage and therefore waste the electric energy whenever a surplus of power exists in the circuit.

Thus, the converters known in the art do not provide an efficient means of harvesting additional power available at the input. For example, a scavenger load consuming relatively little power will cause the scavenging device to draw this necessary amount of power at the input terminal regardless of the actual capability of the current loop. Just like the power consumption at the output terminals may be excessive and may disturb the current loop, consuming too little power is undesirable because this approach fails to efficiently utilize the current loop. Moreover, there may be instances when the supply current drops significantly and the scavenger load may not receive enough power.

SUMMARY

A bidirectional DC to DC converter for scavenging, storing, and releasing energy in a circuit with limited power efficiently transfers excess electrical power available in the circuit to a storage device and, when there is a demand in the circuit for more power, efficiently draws electrical power from the storage device and supplies the power to the circuit. In one aspect, the circuit includes a power source and a power load. In some embodiments, the converter includes a pair of input terminals connecting the converter to the circuit, a pair of output terminals connecting the converter to the storage device, an inductor for storing current or another element capable of accumulating electrical energy, two electrical switches controlling the direction of current and power accumulation in the converter, and a control circuit operating the two switches to vary the duty cycle of an inductor current. In this respect, the bidirectional DC to DC converter provides PWM (Pulse Width Modulation) pulses to a corresponding circuitry.

In another aspect, the bidirectional DC to DC converter increases the efficiency of a circuit by maximizing the use of available power. In yet another aspect, the bidirectional converter is able to direct the stored power to a circuit at a faster rate than the power is scavenged from the circuit. In one embodiment, the bidirectional DC to DC converter receives control signals from a dedicated analog circuitry generating PWM pulses. In another embodiment, the bidirectional DC to DC converter is controlled by a microcontroller coupled to a device powered via the bidirectional DC to DC converter.

Further, a method of scavenging power in a current loop involves inserting a scavenging device in series with a power source and a power consuming device, regulating the voltage drop across the input terminals of the scavenging device, and providing power at the output terminals available from the controlled voltage drop and the loop current. In particular, voltage drop across the scavenging device is regulated by means of a feedback circuit generating an input voltage signal and a regulator circuit using the input voltage signal to control the timing of charging and discharging an inductor. The regulator circuit may be a conventional DC to DC converter or a circuit having several discrete components such as comparators.

In some embodiments, the power source is a variable current or voltage source. In an embodiment, the scavenging device is a DC to DC converter using a feedback circuitry to regulate the input voltage. In one embodiment, the input regulated DC to DC converter maintains a substantially constant voltage across the input terminals. In another embodiment, the input regulated DC to DC converter adjusts the voltage across the input terminals according to the input current so that more available power is scavenged when the loop current is low. In another embodiment, the input regulated DC to DC converter further includes an isolation transformer at the output in order to prevent energy from being transferred back to the input terminals in a fault condition. In this respect, the use of an isolation transformation improves Intrinsic Safety of the scavenging device. In another embodiment, the input regulated DC to DC converter further provides a line filtering function in order to increase impedance in the current loop and thus allow for modulation across the loop.

DETAILED DESCRIPTION OF THE DRAWINGS

DETAILED DESCRIPTION

Figure 1:
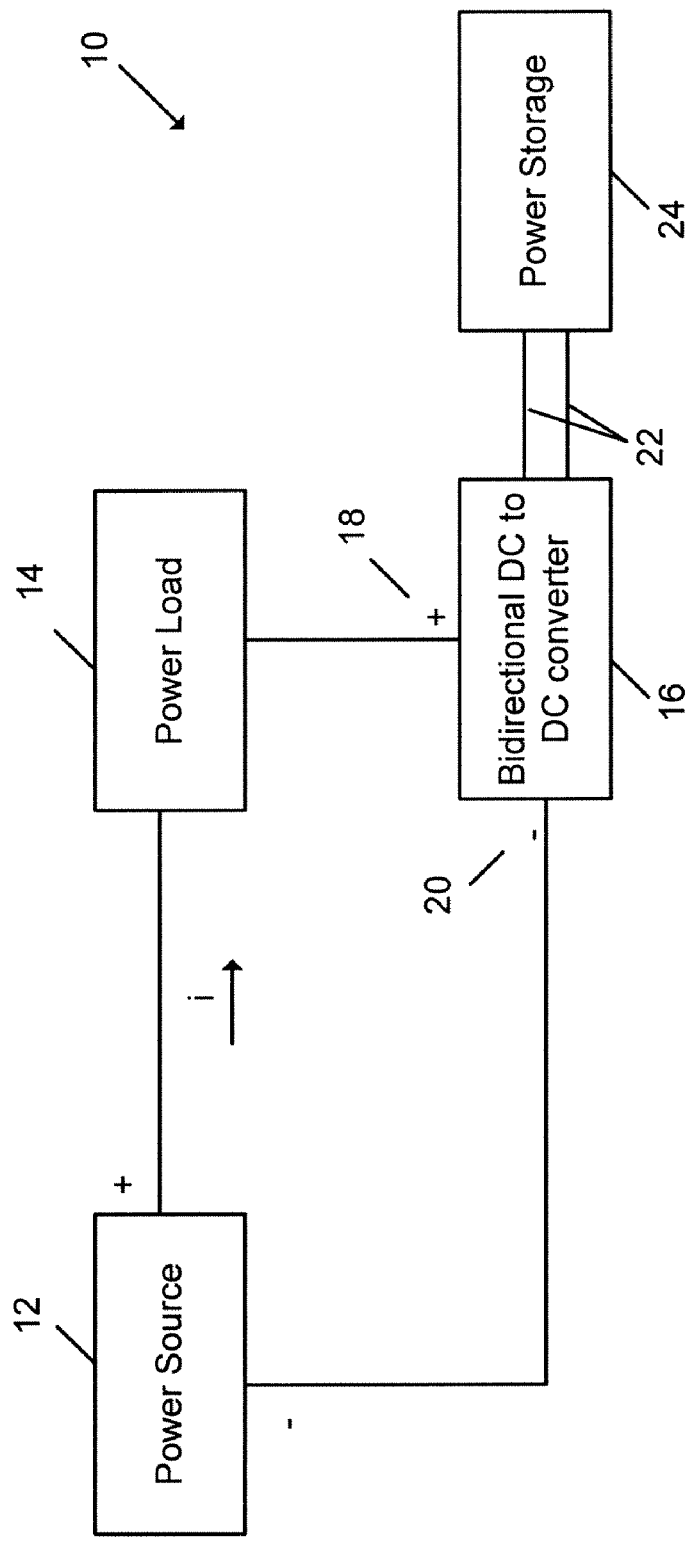
FIG. 1 is a schematic representation of a circuit in which a bidirectional DC to DC converter may be utilized.

FIG. 1 schematically illustrates a circuit 10 in which a bi-directional DC to DC converter may be used. A power source 12 supplies electrical power to a power load 14. The amount of power available in the circuit 10 may not be predictable at all times. In particular, power demands of the load 14 may change over time. Additionally, the amount of energy available at the power source 12 may not stay constant and may similarly vary with time. A bi-directional DC to DC converter 16 may be connected in series with the power source 12 and load 14. The bidirectional converter 16 may have a positive input terminal 18 and a negative input terminal 20. Further, the bidirectional converter 16 may have an output terminal pair 22.

In operation, the bidirectional DC to DC converter 16 draws excess power from the input terminals 12 and 16 and directs the excess power to a power storage device 24 via the output 22. Conversely, when the load 14 requires more power than can be supplied by the power supply 12, the bidirectional converter 16 draws power from the power storage device 24 and outputs the stored power to the circuit 10 via the input terminals 12 and 16.

The power source may 12 be a battery, a generator, or any other power source known in the art. The power load 14 may be a motor, a sensor, or any other device. Generally speaking, the circuit 10 may contain various power consuming devices characterized by different power requirements.

Figure 2:
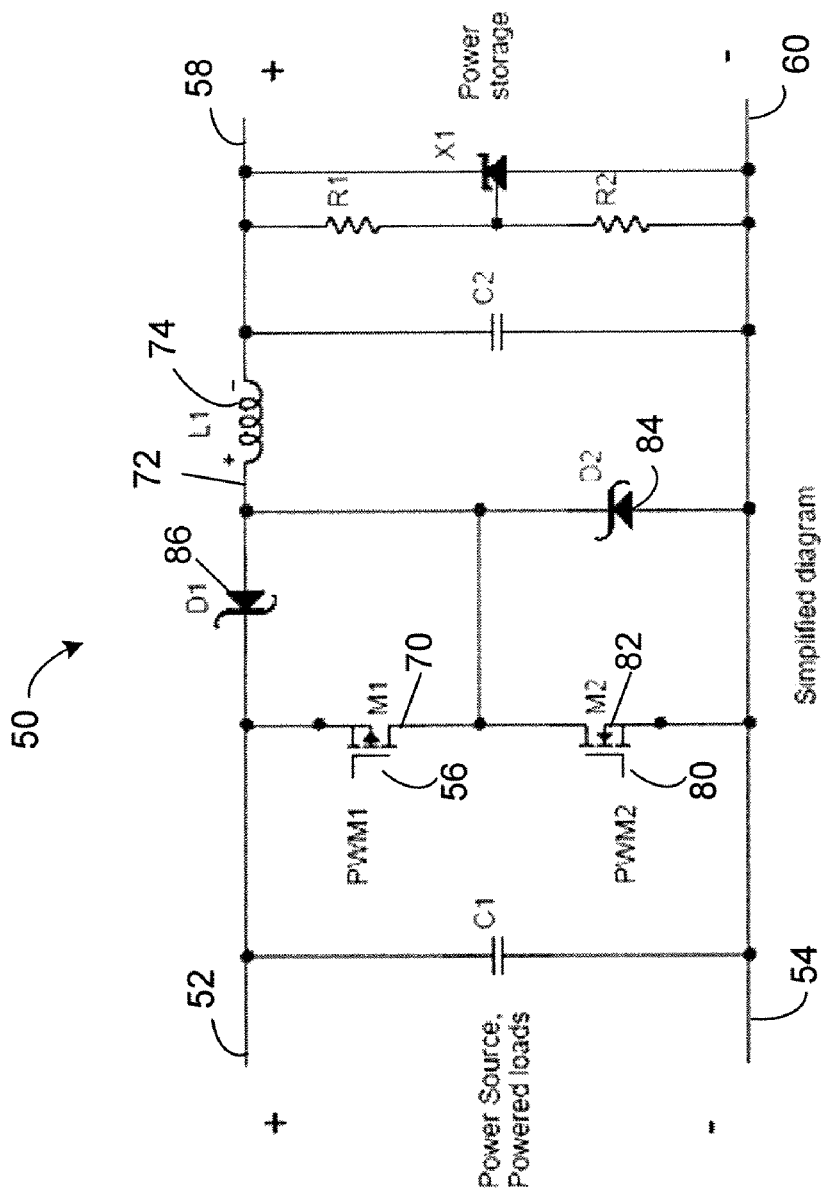
FIG. 2 is an electrical diagram illustrating a bidirectional DC to DC converter in one possible circuit configuration.

Referring to FIG. 2, a circuit 50 corresponding to one possible implementation of the bidirectional converter 20 may include a positive input terminal 52 and a negative input terminal 54. When excess power is available at the input terminals 52 and 54, a buck PWM signal 56 may gate power available at the input and direct this power to a power storage 24 connected to the circuit 50 via the output terminals 58 and 60. At this stage of the operation of the bidirectional converter 16, the voltage across the power storage 24 may be, for example, 1V while the voltage across the input terminals 52 and 54 may be 3V. The "ON" value of the PWM signal 56 may cause a switch 70 to connect the input 52 to a positive terminal 72 of an inductor 74. More specifically, the current may flow from the terminal 52 through a connection 76 to the terminal 72. A boost PWM signal 80 will meanwhile remain in the "OFF" state and will maintain a switch 82 in a disconnected state. The voltage difference of 2V (3V−1V), to continue with the example given above, will apply across the inductor 74 and will cause the inductor 74 to build up current.

In the "OFF" state of PWM 56, the switch 70 is in a disconnected state. The current may flow through an EMF diode 84 in the direction of the input terminal 72 of the inductor 74. The EMF diode 84 may be connected to ground in order to pull additional current not supplied at the input and thus increase the overall efficiency of the circuit 50. As one skilled in the art will recognize, the current will continue to flow until the magnetic field collapses and the electromotive force (EMF) disappears completely. In this manner, the energy may transfer to the power storage in a controller manner. In other words, a higher voltage available at the input terminals of the circuit 50 is applied in a PWM, or partial duty cycle, form to a lower voltage input of a storage device.

Referring back to FIG. 1, the power load 14 may, at some point, require more voltage than the power source 12 may supply. If the power storage 24 stores enough energy, the bidirectional DC to DC converter 16 may transfer the necessary power from the power storage 24 to the power load 14 and thus enable the circuit 10 to continue operating. Referring again to FIG. 2, the voltage across the output terminals 58 and 60 may still be at 1V while the voltage requirement across the input terminals may 52 and 54 may remain at or near 3V. In this state, the buck PWM signal 56 may remain in the "OFF" state while the boost PWM signal may not operate the switch 82 to cyclically open and close the connection.

In particular, the "ON" state of PWM 80 may close the switch 82. When the switch 82 is closed, the positive terminal 72 of the inductor 74 will effectively connect to ground. This will cause the current to start building up in the inductor 74. When the PWM 80 transitions to the "OFF" state, the current will flow from the terminal 58 of the power storage device 24, through a flyback diode 86, and to the terminal 52. Thus, the energy saved in the power storage 24 may be efficiently transferred back to the power load 14.

The PWM signals 56 and 80 may operate in accordance with the voltage sensed across the terminals 52 and 54 or across the power load 14, for example. In short, any signal indicative of the voltage demands in the circuit 10 may be used to regulate the operation of the circuit 50 via the PWM signals 56 an 80.

One skilled in the art will also recognize that an electronic switch may be a Metal Oxide Semiconductor Field Effect Transistor (MOSFET), a different type of a transistor, or any other high-frequency electronic switching means known in the art.

Figure 3:
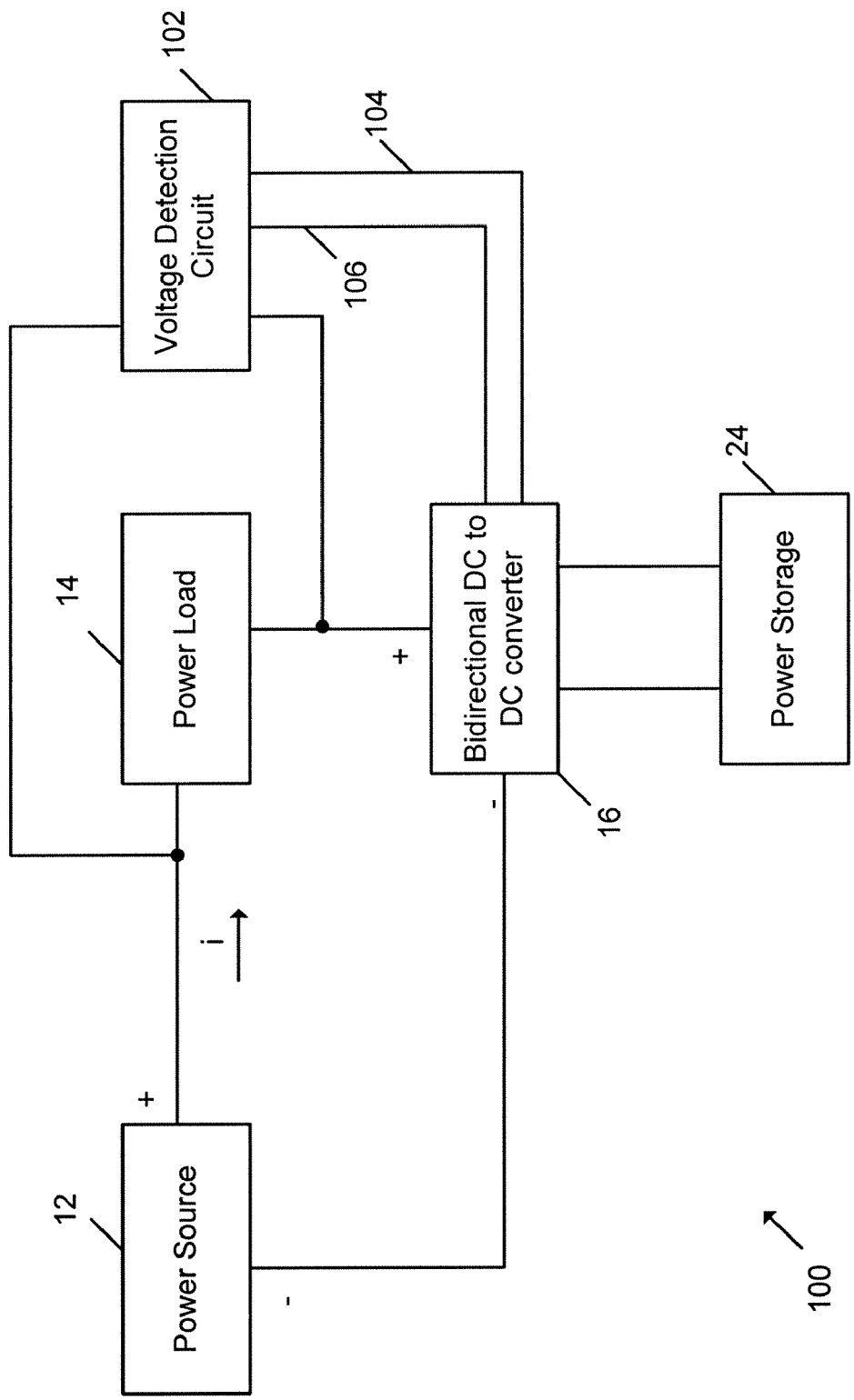
FIG. 3 is a schematic representation of a circuit in which a bidirectional DC to DC converter of the present disclosure works in cooperation with a voltage detection circuit.

An exemplary arrangement including a voltage detecting circuit is illustrated in FIG. 3. A circuit 100 is similar to the circuit 10 with the exception of a voltage detection circuit 102. The circuit 102 may measure the voltage across the power load 14 and supply signals 104 and 106 to the bidirectional converter 16. In on possible embodiment, the signals 104 and 106 may be the PWM signals 56 and 80. Alternatively, the voltage detecting circuit 102 may not have an oscillation capability and may produce simple voltage signals. In this case, the bidirectional converter 16 may drive the PWM pulses 56 and 80 upon processing the signals 104 and 106 using additional circuitry (not shown). In yet another embodiment, the voltage detection circuit 102 may detect voltage changes across the entire circuit 100 or, in other words, across both the power load 14 and the converter 16.

Figure 4:
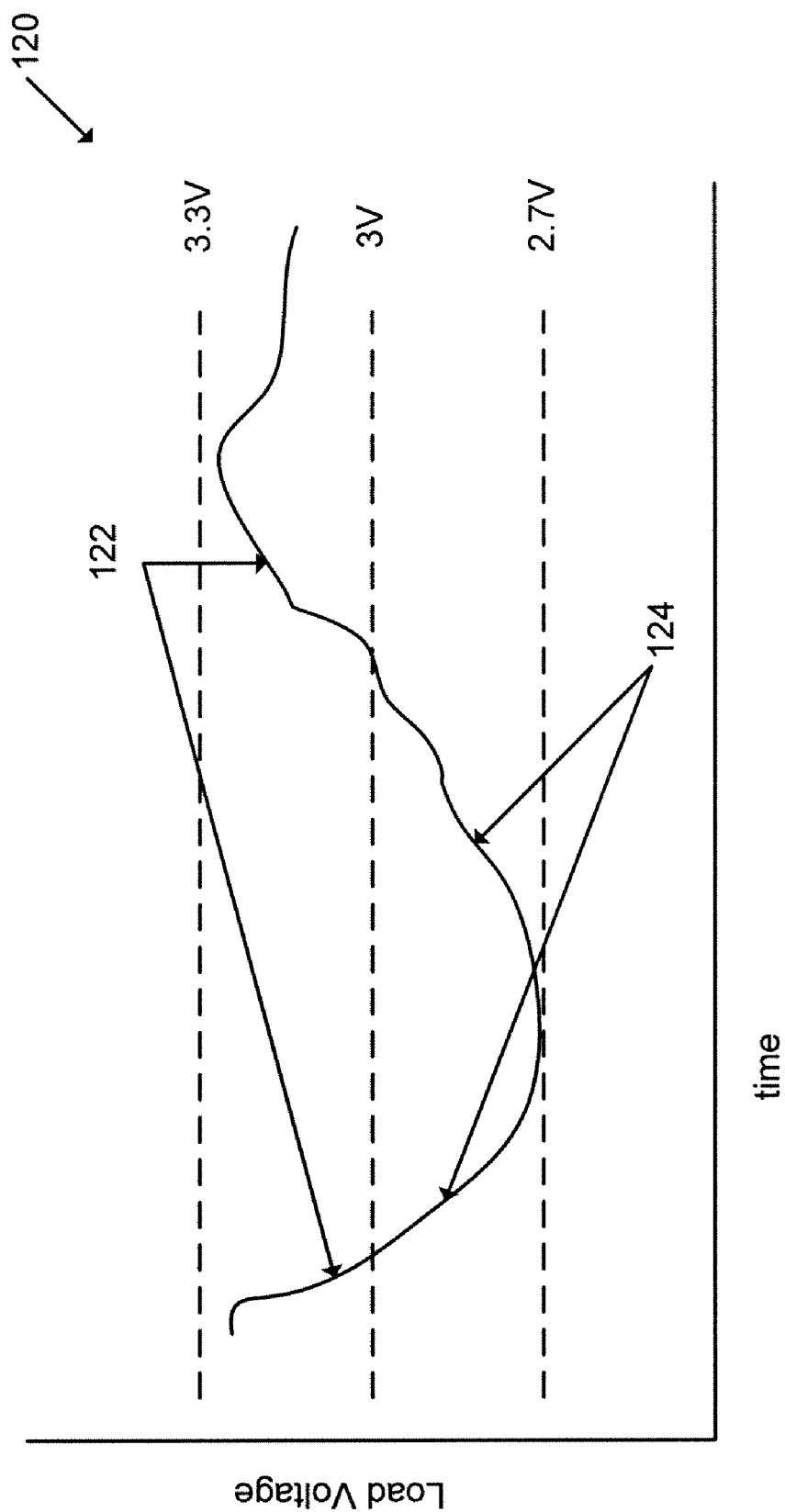
FIG. 4 is an exemplary waveform illustrating variations in voltage across a typical device used in a 4-20 mA loop as a function of time.

In one possible implementation, two threshold values may be selected in view of the specific requirements of the load 14 or of the entire circuit 100. For example, the load 14 may generally require 3V to operate but may be still operational anywhere in the 2.7-3.3 V range. Thus, a voltage detection circuit may be constructed to detect changes in voltage across the power load 14 and drive the two PWM signals accordingly. A waveform 120 in FIG. 4 illustrates an exemplary change of voltage across one or more circuit elements as a function of time. As shown, the actual voltage detected by a the circuit 102 may vary in the 2.7-3.3 V range while the target voltage in this example may be 3V. The bidirectional converter 16 ensures, whenever possible, that the voltage neither exceeds the upper limit nor falls below the lower limit. Obviously, excessive voltage may cause damage to one or more devices in the circuit 100 while insufficient voltage may prevent the circuit 100 from operating.

In reference to FIGS. 2 and 4, regions 122 corresponding to the periods of time when the detected voltage exceeds the 3V target are associated with the buck mode of the circuit 50. As discussed above, in buck mode, the PWM 56 controls the switch 70 in order to regulate the transfer of excess power to the storage device 24. On the other hand, the regions 124 corresponding to the periods of time when the detected voltage falls below the 3V target are associated with the transfer of power from the power storage 24 back to the circuit 10 or 100. In this mode of operation, the PWM 80 drives switch 82 in boost mode.

Figure 5:
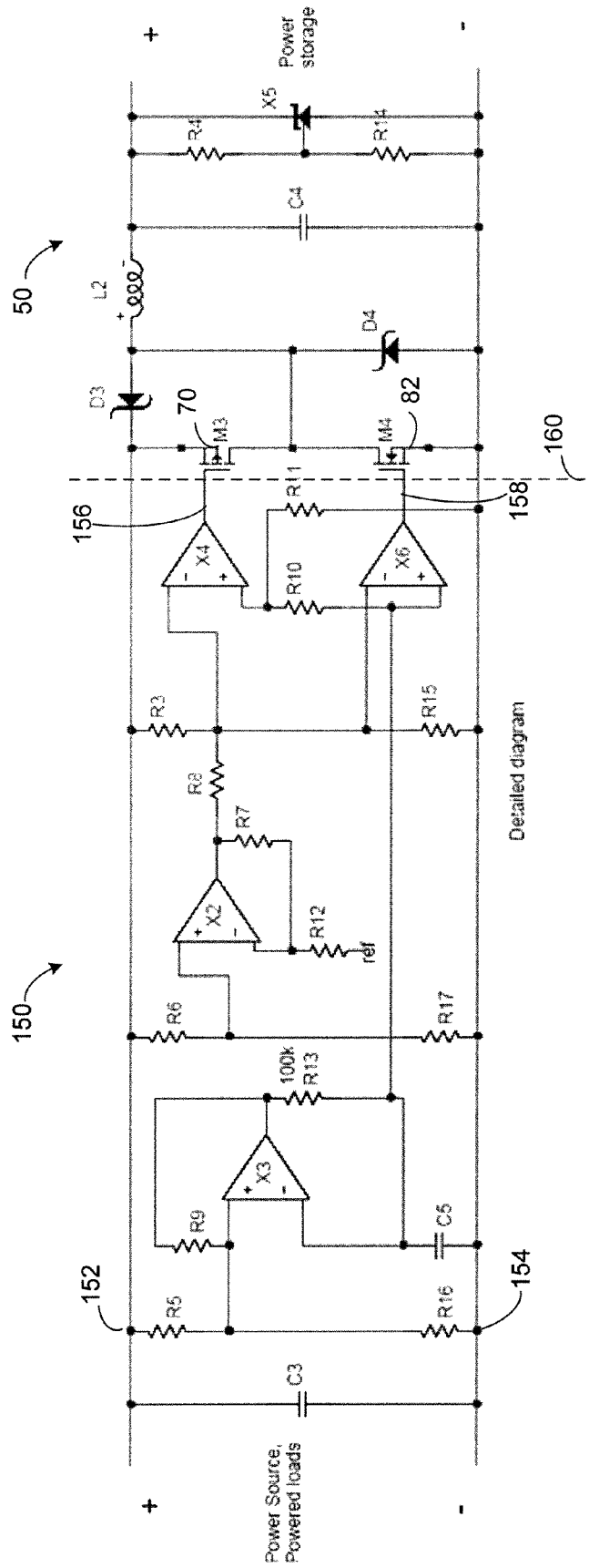
FIG. 5 is an electrical diagram illustrating one possible circuit for generating Pulse Width Modulation signals for use with a bidirectional DC to DC converter of the present disclosure.

FIG. 5 illustrates an exemplary implementation of an analog PWM circuit adapted to provide the PWM pulses in response to voltage changes across the terminals 152 and 154. The terminals 154 and 156 may be connected across the one or more power loads 14 and possibly across the power source 12 as well. It will be appreciated that the values of resistors may be selected according to the specific requirements of the circuit, such as the range of tolerable voltages, for example, and according to the type of connection selected for the PWM circuit 150. The PWM circuit 150 pulses a small amount of current to control the switches 70 and 82. Thus, the two outputs of the circuit 150 are the control wires 156 and 158. A dotted line 160 is additionally depicted to schematically indicate the boundary between the circuits 150 and 50.

It will be further appreciated here that various other implementations of the PWM circuit 150 are possible. For example, the PWM circuit may be implemented by combining several available microchips or the entire circuit may be implemented as a single Application Specific Integrated Circuit (ASIC).

It is also contemplated that a microcontroller may be used to generate the necessary PWM pulses. As discussed above, a bidirectional DC to DC converter may be used in for power scavenging purposes on a 4-20 mA control loop typical in the process control industry, for example. In particular, a bidirectional DC to DC converter may be controlled in such as manner as to direct excess power available in a 4-20 mA loop to a supercapacitor, for example. An additional device, such as a microcontroller-controlled radio, may be one of the consumers of this scavenged power. While a PWM circuit 150 could be used to control the transfer of power between the radio and the storage device, it may be prudent to utilize the microcontroller instead. Because the microcontroller is typically aware of how much power the radio requires at a given moment, the microcontroller may generate the PWM signals 56 and 80 according to these instantaneous demands. In one possible embodiment, the microcontroller may direct the bidirectional converter 16 via the boost PWM signal 80 to draw power from the storage device 24 when the radio is transmitting. Conversely, the microcontroller may activate the PWM signal 56 when the radio is idle.

Additionally, the microcontroller may anticipate changes in power consumption of the radio by a small amount of time, such as microseconds. For example, the microcontroller may direct the bidirectional converter to begin drawing power when a device-specific condition requiring power consumption is detected in order to minimize the delay prior to the beginning of transmission. More specifically, a sensor operating in a process control environment may detect an abnormality such as excessive pressure or insufficient temperature, for example, and the microcontroller may effectively prepare the radio for transmission by sending a corresponding PWM signal to the bidirectional controller.

As yet another alternative, the microprocessor may send simple signals indicative of the required voltage while another circuit, either provided as part of the bidirectional DC to DC converter or as a separate component, may use this signal to generate the appropriate PWM pulses. In this sense, the microprocessor may be programmed with a simpler logic in order to allow the radio to retain more of the processing power for radio-related purposes.

Of course, the microcontroller may also establish multiple levels of power demand. For example, the microcontroller may send wider boost PWM pulses when the radio is known to consume large amounts of power in the state of transmission, shorter boost PWM pulses when the radio is known to consume moderate power in the state of reception, and wide buck PWM pulses when the radio is idle and thus consumes little or no power.

Figure 6:
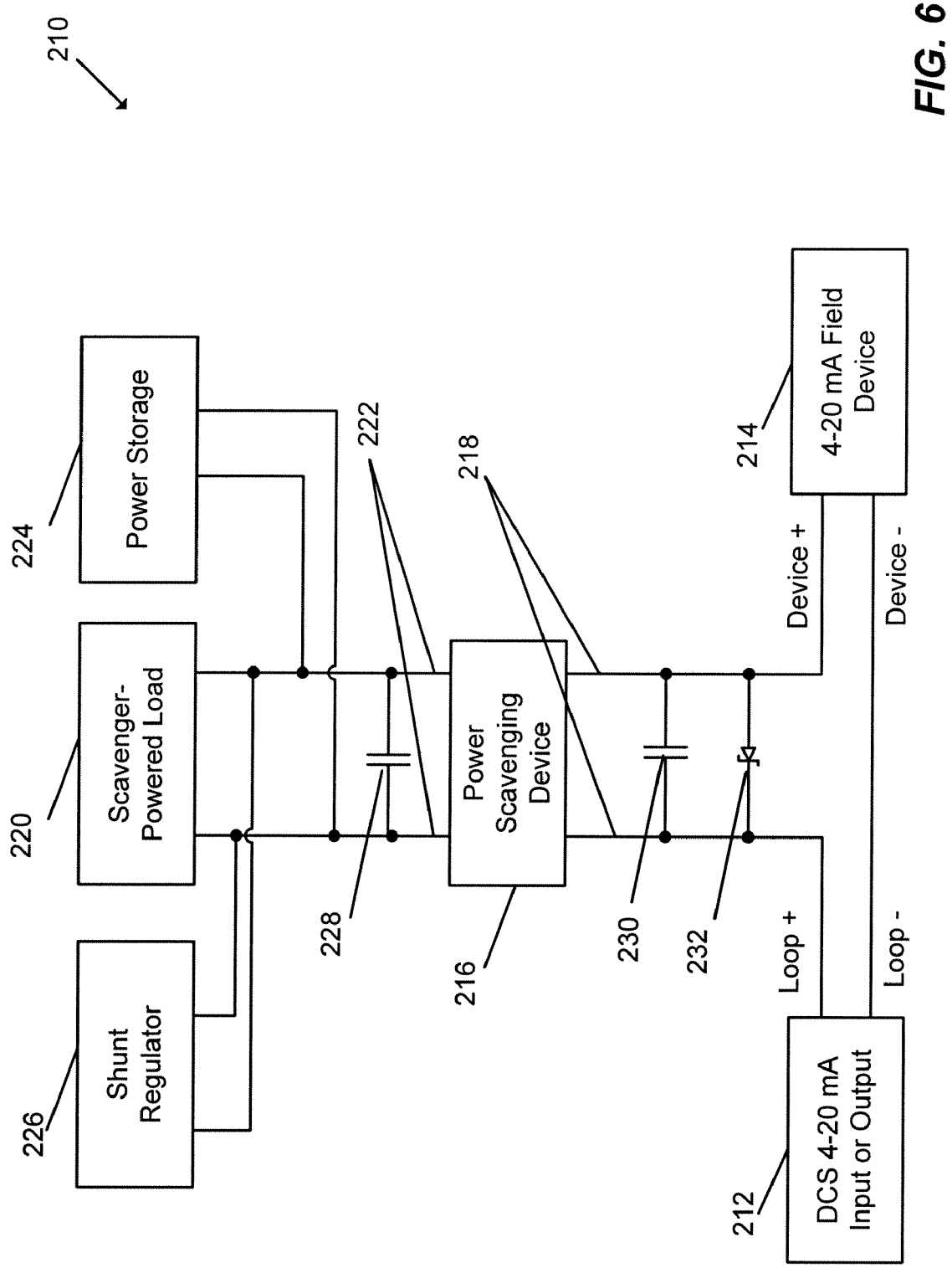
FIG. 6 is a schematic representation of a circuit in which an input regulated DC to DC converter, used as a power scavenging device, may be utilized to harvest excess power.

In another aspect, a bidirectional DC to DC converter may be used in a circuit which includes an input-regulated DC to DC converter adapted for scavenging electrical power and, in particular, for scavenging power in a circuit characterized by variable DC current. FIG. 6 is a schematic representation of a system in which an input-regulated power scavenging device may be used to efficiently harvest excess power from a current loop and direct the excess power to a load, a storage device, or both. As illustrated in FIG. 6, a current loop or circuit 210 includes a Distributed Control System (DCS) 212, a field device 214, and a power scavenging device 216 connected in series with the field device 214. These and other circuit elements illustrated in FIG. 6 are connected in a wired manner.

In operation, the DCS 212 and the field device 214 send and receive 4-20 mA analog signals in a manner unpredictable to the scavenging device 216 implemented as an input regulated DC to DC converter. In other words, from the perspective of the scavenging device 216, the current in the loop 210 may uncontrollably vary with time in the 4 to 20 mA range. The power scavenging device 216 is connected to the loop 210 in series through a pair of input terminals 218, with one of the contacts of the pair 218 connecting directly to the positive terminal of the DCS 212 and the other contact connecting directly to the positive input of the field device 214. However, the scavenging device 216 may instead be connected to the respective negative terminals of the DCS 212 and field device 214. During operation, the power scavenging device 216 creates a regulated voltage drop across the input terminals 218. The scavenging device 216 may maintain the voltage at a constant level and thus vary the power consumption at input terminals 218 linearly with the current flowing through the scavenging device 216. The scavenging device 216 may then transfer the power harvested from the input terminals 218 to one or more devices or circuits connected to the output of the scavenging device 216. In another embodiment, the scavenging device 216 may regulate the input voltage according to the current flowing through the scavenging device 216. In particular, the scavenging device 216 may increase the voltage drop across the input terminals 218 as the current through the scavenging device 216 decreases.

A scavenger-powered load 220 may be connected to the power scavenging device 216 through a pair of output terminals 222. The scavenger load 220 may be any type of device consuming either constant or variable power. For example, the scavenger load 220 be a simple electrical element characterized by constant power consumption such as a light emitting diode (LED), for example, or a complex device with varying power demands such as a radio transceiver. It will also be appreciated that while only one scavenger powered load is shown in FIG. 6, the power scavenging device 216 may supply power to multiple loads with different power consumption characteristics.

The scavenging device 216 may be also connected to a power storage 224. The power storage 224 may be, for example, a single supercapacitor, a relatively complex circuitry involving several capacitors connected in parallel, or any other suitable type of a power storage, including those known in the art. As one skilled in the art will recognize, a capacitor may be used as a power storage device because the voltage across a capacitor will increase as current arrives at the capacitor. A high density capacitor, or a supercapacitor, is capable of storing a high amount of charge and may thus be preferable as a power storage device.

Additionally, an adjustable shunt regulator 226 may be connected across the pair of output terminals 222 in parallel with the scavenger-powered load 220 and the power storage 224. The shunt regulator 226 may be used to dissipate the unnecessary power if the scavenger-powered load 220 does not consume all the power available at the output terminals 222. The shunt regulator 226 may be necessary if the power storage 224 is not provided. In other embodiments, it may be preferable not to use a shunt regulator in the loop 210 at all and save all of the excess power from the output terminals 222 in the power storage 224. The adjustable shunt regulator 226 may be implemented in any manner known in the art such as, for example, by using a zener diode and one or several resistors.

As yet another option, a capacitor 228 may be connected across the output terminals 222 in order to filter out the output voltage. Because the output of the power scavenging device 216 is unregulated, the capacitor 228 may be used to smooth out the output voltage particularly if a scavenger powered load 220 is present in the circuit 210. In this sense, the capacitor 228 may be part of a post-regulating circuitry. However, the capacitor 228 may not be necessary if the power scavenging device 216 supplies power primarily to the power storage device 224. In fact, the unregulated aspect of the output at the terminals 222 may actually be desirable if the power at the output terminals 222 is transferred to the power storage 224.

Meanwhile, an input filter capacitor 230 connected across the input terminals 218 the power scavenging device 216 may serve to filter out the input noise. As one skilled in the art will recognize, an input filter capacitor is needed at the input of any DC to DC circuit. The capacitance of the input filter capacitor 230 is a function of the operating frequency of the DC to DC converter used in the power scavenging device 216. Additionally, the voltage across the input terminals 218 may be clamped in order to prevent a failure in the scavenging device 216 from interrupting current flow in the loop 210. For example, a zener diode 232 may be used to ensure that if the voltage across the input terminals 218 rises above a certain limit, the diode will break down and the current will flow in the direction of the 4-20 mA field device 214. One of ordinary skill in the art will recognize that the limit is determined by the physical properties of the selected diode.

The capacitors 228 and 230, the shunt regulator 226, and the zener diode 232 may be included in the power scavenging device 216. Depending on the intended field of application, the power scavenging device may be adapted to regulate the output voltage by means of a shunt circuit 226 or to direct all of the available power to a power storage device 224. It is contemplated that several configurations, with some of the components illustrated in FIG. 6 omitted and some additional components added according to the desired application, may be placed into Application Specific Integrated Circuits (ASICs). Alternatively, the scavenging device 226 may be provided as a separate ASIC which can then used in any configuration discussed herein. As yet another alternative, parts of the circuitry of the power scavenging device may be manufactured as a separate chip working in cooperation with a conventional DC to DC converter.

Figure 7:
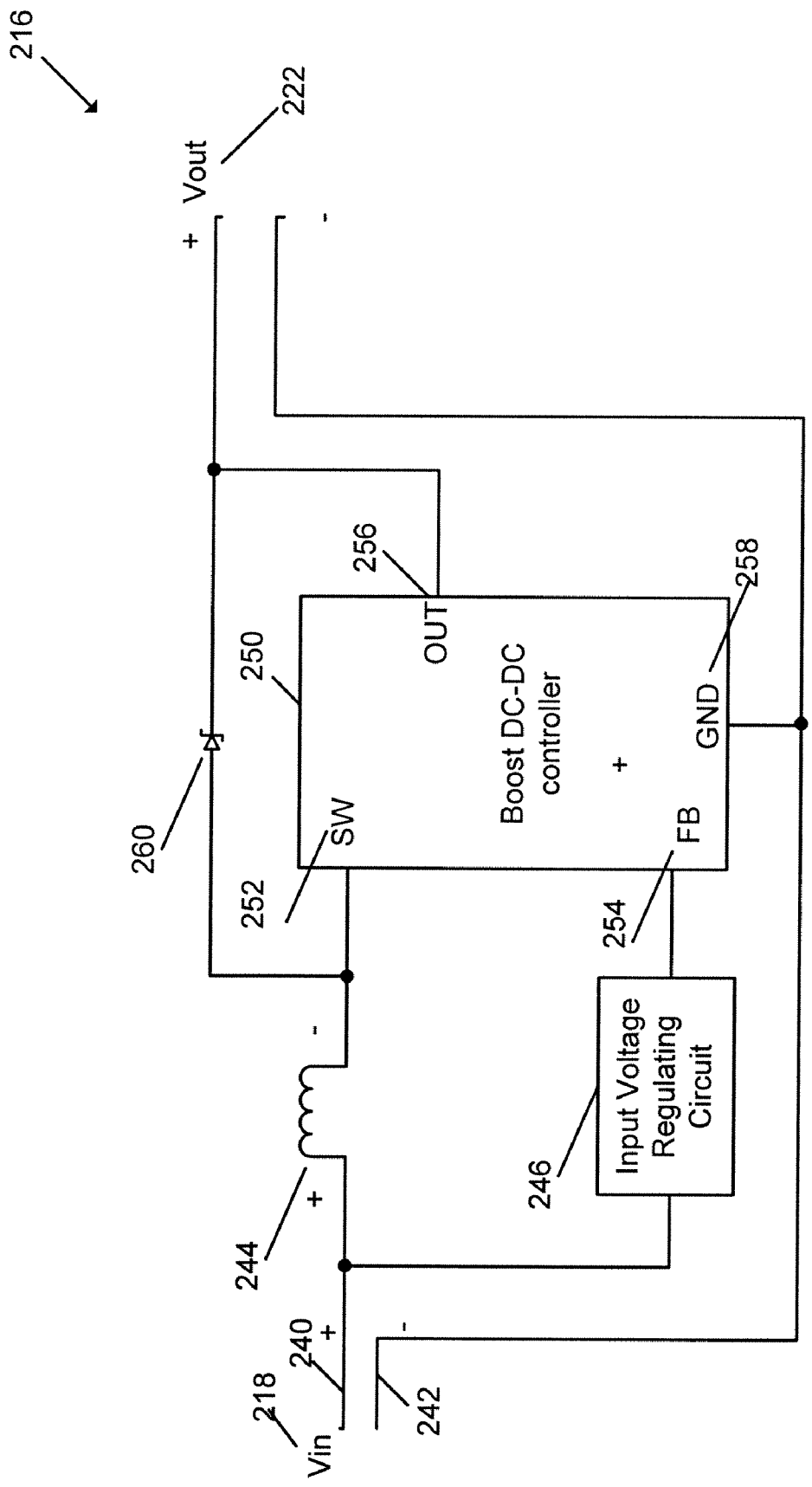
FIG. 7 is a schematic representation of an input regulated DC to DC converter.

FIG. 7 illustrates the power scavenging device 216 in more detail. In accordance with this exemplary layout, the current enters the power scavenging device 216 at the positive terminal 240 of the input terminal pair 218 and leaves through the negative terminal 242. After entering via the positive terminal 240, the current flows to the positive terminal of the inductor 244. Additionally a relatively small part of the current flows to the input regulating circuit 246. The same or substantially same amount of current that enters through the positive terminal 240 leaves through the negative terminal 242. Meanwhile, the circuitry implemented according to the teachings of the present disclosure and discussed in detail below maintains a regulated drop across the terminals 240 and 242. For example, the voltage drop across the terminals 240 and 242 of a scavenging device used in a 4-20 mA current loop may be maintained at a constant 1V.

Referring still to FIG. 7, a boost DC to DC controller 250 regulates the amount of time the inductor 244 accumulates current. The controller 250 may be an off-the-shelf chip such as On Semiconductor NCP1421 or a circuit assembled from several discrete IC components capable of performing a high frequency switching function and to regulate the duty cycle of a switched circuit according to a feedback signal. In particular, the controller may use one or more Metal Oxide Semiconductor Field Effect Transistors (MOSFETs), for example, to quickly open and close electrical connections. The controller adjusts the timing between opening and closing the connections according to the parameters of the oscillation circuit components used in the controller and to the feedback signal, such as current or voltage. In this sense, the controller 250 may provide Pulse Width Modulation (PWM) with a controlled duty cycle to the circuitry of the power scavenging device 216. It will be appreciated that the switching functionality can also be implemented by using discrete semiconductors, OTS integrated circuits, or other components and materials known in the art.

As illustrated in FIG. 7, the controller 250 is equipped with a switch pin 252, a feedback pin 254, an output pin 256, and a ground pin 258. It will be appreciated that the controller 250 may have additional inputs and is not limited to the four pins listed above. As illustrated in FIG. 7, switch pin 252 is electrically connected to the negative terminal of the inductor 244, the output pin is connected to one of the output terminals 222, and the ground pint 252 is electrically connected to the opposite terminal of the terminal pair 222 and to the negative input terminal 242. Further, the feedback pin 254 is connected to the output of the input regulating circuit 246.

During each cycle of operation, the controller 250 first electrically connects the input to the switch pin 252 to the ground pin 258. While the pins 252 and 258 are connected, the current builds up in the inductor 244. Next, the controller 250 disconnects the pins 252 and 258. The collapse of the magnetic field in the inductor 244 pushes the current from the inductor 244 to the positive side of the output terminal pair 222. Further, the negative terminal of the inductor 244 may be connected both to the switch pin 252 and to the positive side of the output terminal pair 222 via a flyback diode 260. The flyback diode 260 is preferably a Schottky diode but may also be a different type of a diode. The flyback diode 260 provides synchronous rectification to the output of the inductor 244. However, if the controller 250 is already capable of synchronous rectification, a flyback diode may not be required.

With continued reference to FIG. 7, some of the current entering the scavenging device 216 at the terminal 240 is directed to the input voltage regulating circuit 246. The circuit 246 may generate a voltage signal indicative of the strength of the current at the input terminal 240. The controller 250 uses the signal generated by the regulating circuit 246 in order to selectively increase or decrease the production of power at the output terminal pair 222. For example, the controller 250 may increase the duty cycle of the pulses and thus lower the input voltage across the terminal pair 218 in response to the voltage level detected by the circuit 246. The implementation of the circuit 246 is discussed in greater detail below.

Figure 8:
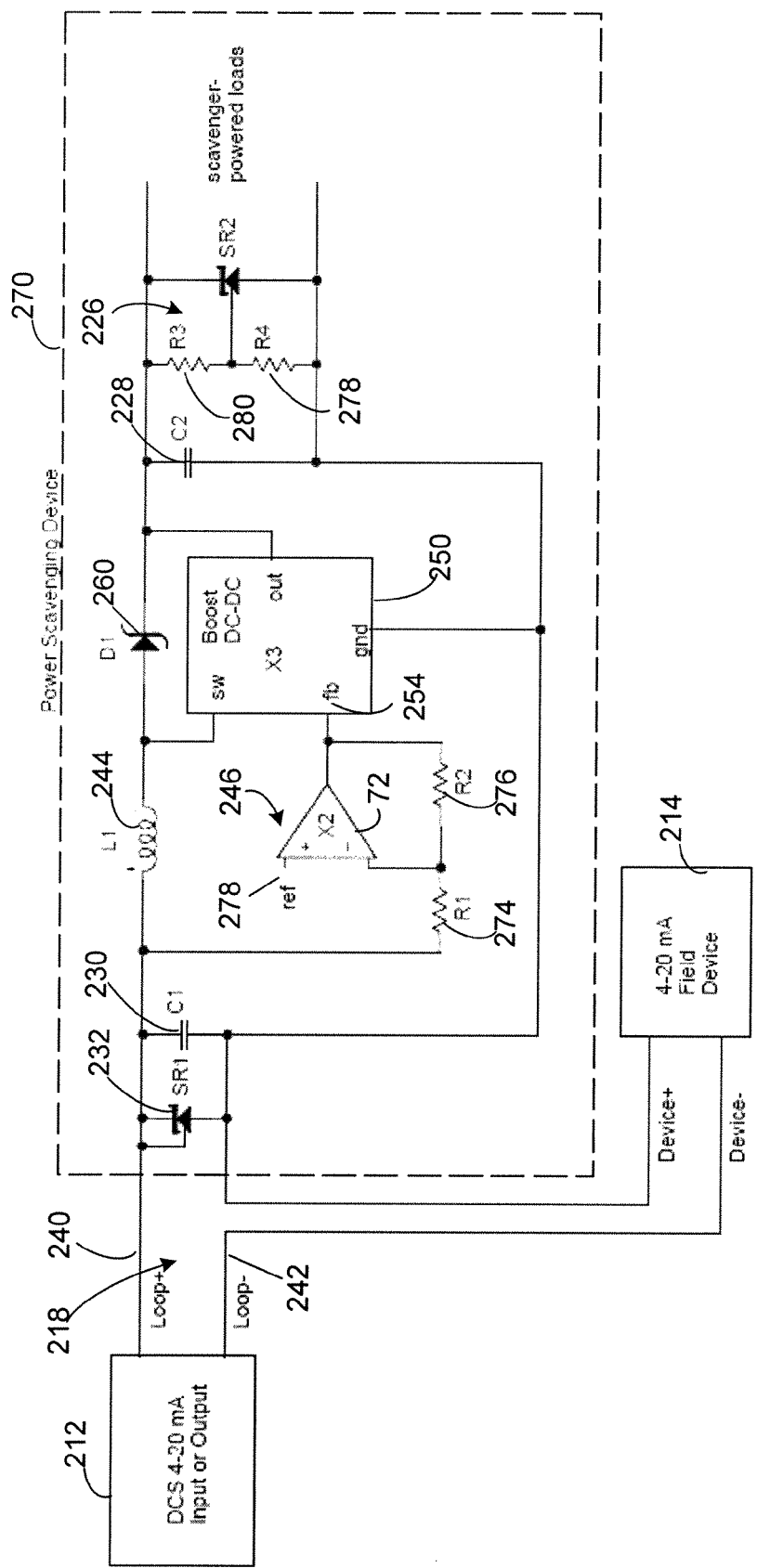
FIG. 8 is an electrical diagram illustrating an input regulated DC to DC converter in one possible circuit configuration.

FIG. 8 illustrates an electrical diagram of one possible embodiment of a power scavenging device 270. In this configuration, the power scavenging device 270 incorporates both a diode 232 to clamp the voltage at a desired level and an input filter 230. Importantly, in the configuration depicted in FIG. 8, the output voltage is controlled by the shunt circuit 226. As indicated above, this configuration may be useful if an input regulated DC to DC converter is used to power a load requiring a constant voltage. The shunt circuit 226 will dissipate the excess power and ensure that the power load does not receive more power than is required.

The input voltage regulating circuit 246 includes an operational amplifier 272 and resistors 274 and 276. The amplifier 272 may use the reference voltage 278 at its non-inverting input and the variable voltage at its inverting input to control the relationship between the input voltage across the terminals 240 and 242 and the voltage supplied to the feedback pin 254. One skilled in the art will appreciate that the values of the resistors 274 and 276 may be selected according to the desired voltage drop. As discussed above, in a typical 4-20 mA loop, such as one used in the process control industry, a voltage drop of 1V across the scavenging unit 216 or 272 is usually tolerable. Similarly, resistors 278 and 280 used in the shunt circuit 226 may be selected according to the desired voltage output.

Figure 9:
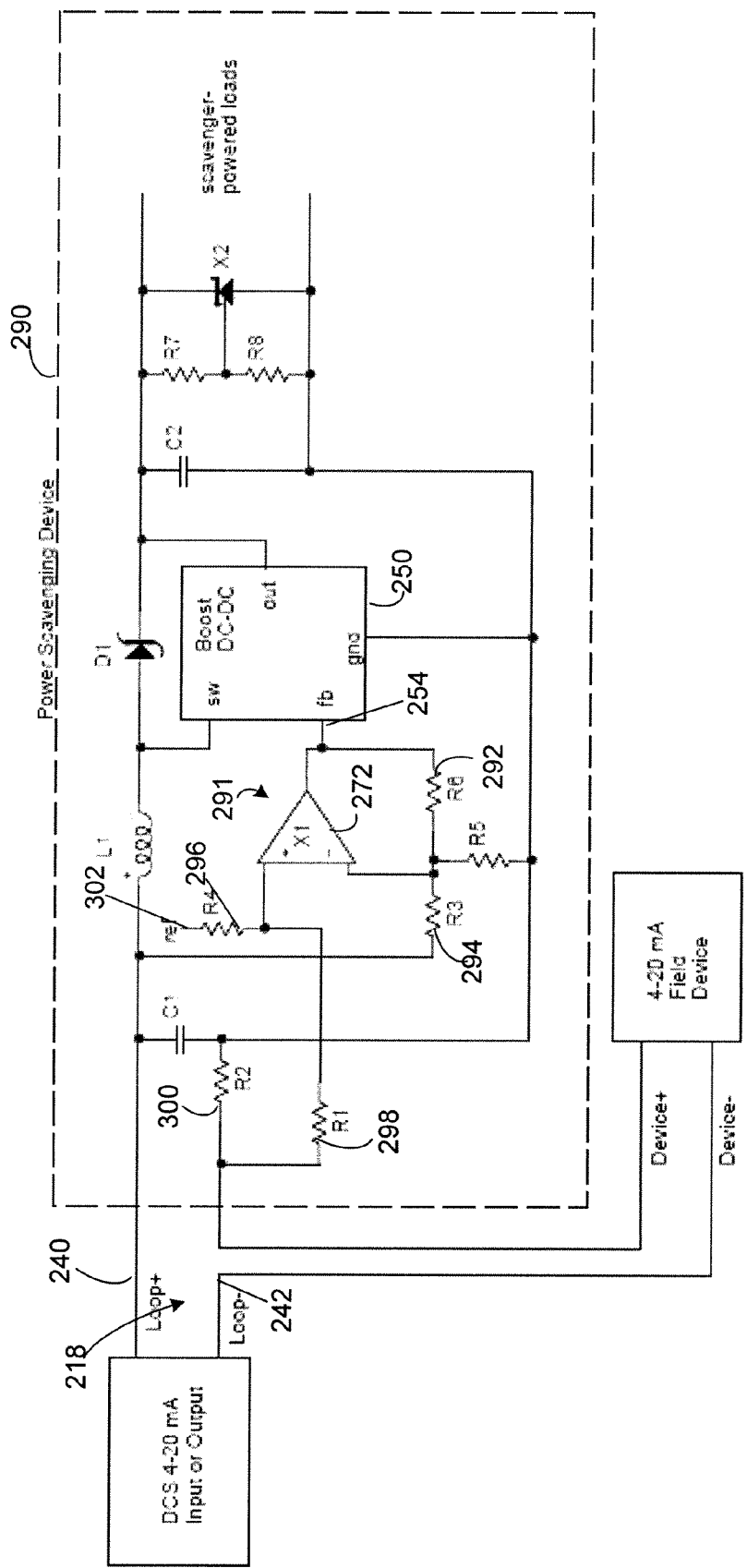
FIG. 9 is an electrical diagram of an input regulated DC to DC converter with inverse current-dependent voltage drop.

FIG. 9 illustrates another contemplated embodiment of an input regulated DC to DC converter which can be used for power scavenging. A power scavenging circuit 290 may include most of the elements of the power scavenging device 270 discussed above. Additionally, the power scavenging circuit 290 may regulate the input voltage in a more efficient and practical manner than the scavenging device 270. In particular, the control loop 210 may experience lower voltage drops across various circuit elements such as the field device 214 when the current in the loop 210 is lower. In the case of a 4-20 mA circuit used in the process control industry, for example, the DCS 212 will "see" a lower voltage drop across the loop when it generates a 4 mA signal and, conversely, the DCS 212 will see a higher voltage drop when the analog signal is closer or at the 20 mA level. Similarly, a field device such as the device 214 will typically see a lower or higher voltage drop across the DCS 212 when the field device generates, rather than receives, a 4-20 mA signal. Thus, the loop 210 may tolerate larger voltage drops across the scavenging circuit 216, 270, or 290 at lower loop currents.

The power scavenging device 290 illustrated in FIG. 9 draws more power from the input terminal pair 218 at lower input currents entering the scavenging device 290 through the terminal 240 than the scavenging device 270, for example, because the device 290 drops more voltage across the terminal pair 218. Clearly, this feature may be desirable if the scavenger-powered load 220 has high-power requirements. In particular, a regulating circuit 291 including the amplifier 272, a gain-limiting component or resistor 292, and resistors 294-300 regulates the voltage across the terminal pair 218 so that the input voltage varies inversely with the input current as sensed by the circuit 291. The elements 292-300, as well as the reference voltage 302, are selected and connected in a manner that generates a larger feedback signal from the regulating circuit 291 to the feedback pin 254 when the input current is larger. In this sense, the scavenging device 290 utilizes the negative impedance of the regulating circuit 291. Thus, in response to a larger signal at the feedback pin 254, the controller 250 will reduce the duty cycle of the PWM and thus reduce the amount of power pumped to the output terminals 222. Similarly to the power scavenging devices 216 and 270, the scavenging device 290 regulates the input voltage irrespective of the output of the scavenging device 290.

It will be further appreciated that the inverse relationship between the input current voltage supplied to the feedback pin 254 may be implemented by other means known in the art. In the embodiment illustrated in FIG. 9, for example, the resistor 300 functions as the output current sensor because the current returning from the scavenging device 290 to the output terminal 242 must pass through the resistor 300. However, any known means of sensing the current may be similarly used to regulate the feedback pin 254 of the controller 250 and thus vary the amount of power drawn by the scavenging device 290.

Figure 10:
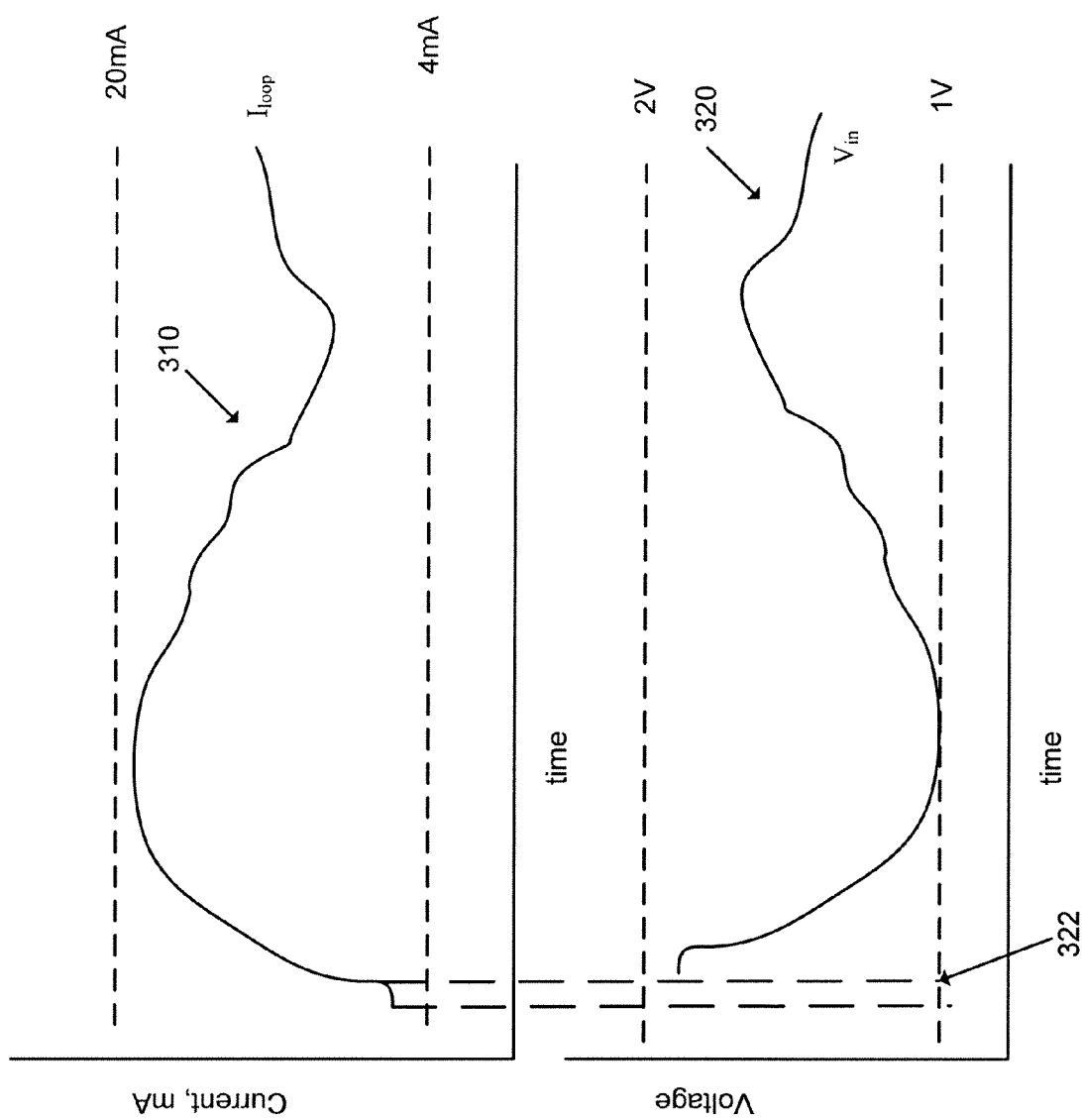
FIG. 10 is an illustration of exemplary input current and voltage waveforms regulated by a converter consistent with one of the embodiments.

Generally speaking, it is desirable to select the circuit element parameters in view of the maximum tolerable voltage drop. For example, it is prudent to select the resistance values of the resistors 292-300 according to the voltage drop tolerable at 20 mA if the scavenging device 290 is intended for use in a process control industry. FIG. 10 illustrates an exemplary input and voltage at the input of the power scavenging device 290 connected in a 4-20 mA loop as functions of time. In particular, the waveform 310 may be the current flowing through the input terminal 240 while the waveform 320 may be the voltage across the input terminal pair 218. Both waveforms are depicted on a relatively large time scale, such as seconds. As illustrated in FIG. 10, the inverse relationship between the input voltage and the input current ensures that the waveform 220 appears to be a mirror reflection of the waveform 310. It will be also appreciated that the waveform 320 may appear as having a delay 322 relative to the waveform 310 which may be in the order of micro- or even nanoseconds. The scavenging unit 290 maintains the voltage drop within the 1-2 V range as a function of the input current only and independently from the voltage or power requirements at the output terminals 222.

Another desirable aspect of operation of any scavenging device is safety and, in particular, the Intrinsic Safety (I.S.) standards accepted in many industries. Generally speaking, I.S. certification associated with a device places specific energy limitations on this device. For example, handheld HART communicators are limited to $V_{oc} <= 2V$ and $I_{sc} <= 32$ mA, where $V_{oc}$ is the maximum voltage across the communicator and $I_{sc}$ is the maximum current allowed through the communicator. The I.S. standards associated with a HART communicator may be used as a guideline to designing a safe scavenging device for use in a 4-20 mA because providing power to HART communication circuit is a highly probable field of power scavenging application.

As discussed above, boost DC to DC converters known in the art may draw too much power from the input terminals and interfere with the operation of the circuit from which the power is being scavenged. This type of interference may prevent devices from receiving power or signals propagated through the circuit. On the hand, the conventional DC to DC converters may also fail to contain the scavenged power in a fault condition and damage the circuit by releasing the energy back into the circuit, especially if the scavenged-powered load is a capacitor or a similar power storage device. This type of failure may be more dangerous than overdrawing power from the circuit. If used in the process control industry, for example, the conventional boost DC to DC converters may carry a high operational risk at least because a 4-20 mA loop may connect explosive or otherwise hazardous devices. Thus, sudden spikes in the loop current may cause a spark thereby triggering an explosion. However, meeting the safety standards discussed above by any conventional means would inevitably reduce the power efficiency of a boost DC to DC converter.

Figure 11:
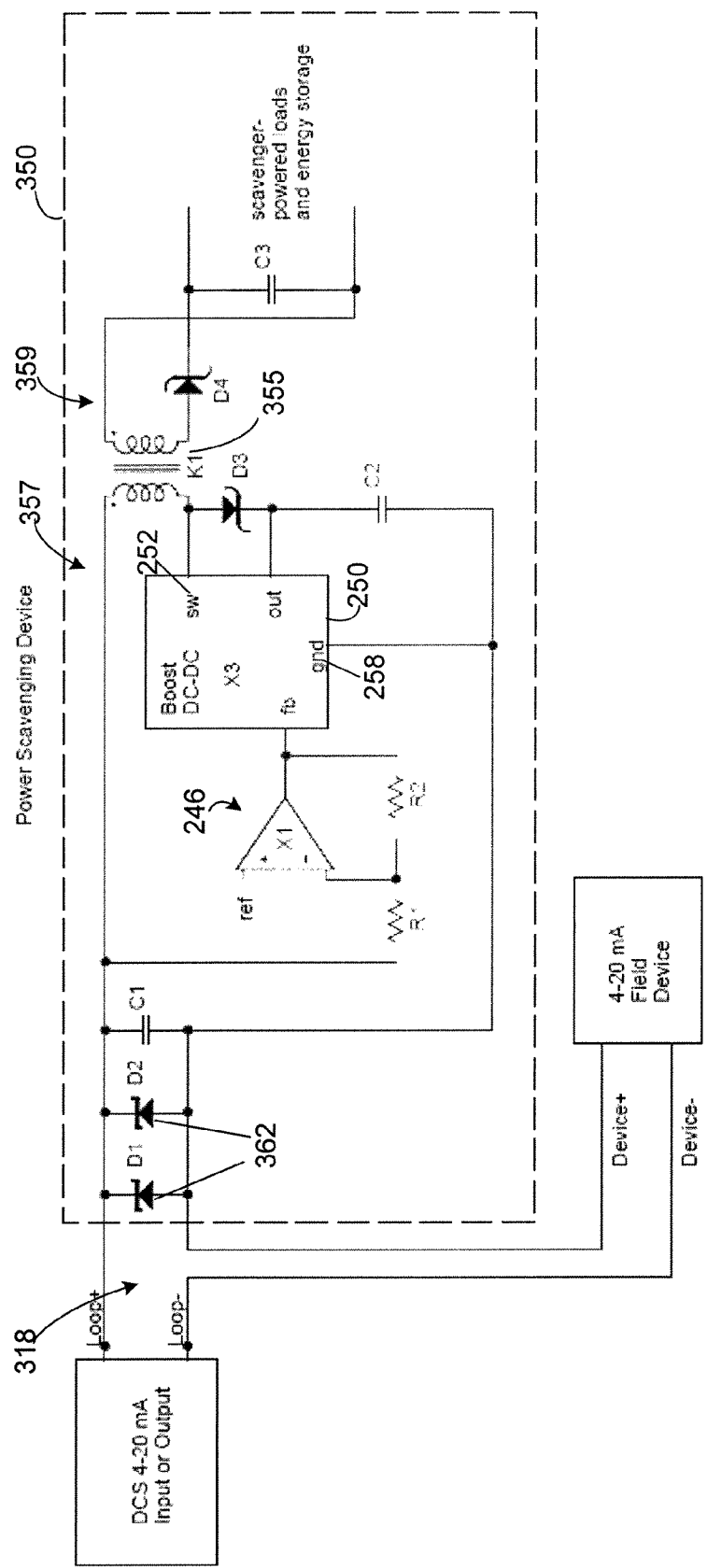
FIG. 11 is an electrical diagram of an input regulated DC to DC converter with an isolation transformer used for Intrinsic Safety (IS) energy limiting.

Because an input regulated transformer consistent with the embodiments disclosed herein is particularly well-suited for harvesting power for a power storage device, meeting the Intrinsic Safety (I.S.) limitations is clearly a concern in the implementation of such a transformer. FIG. 11 illustrates an isolated input regulated DC to DC transformer 350 used for power scavenging in current loop 210. The DC to DC transformer or power scavenging device 350 provides a fault energy limitation by means of an isolation transformer 355. Importantly, the isolation transformer 355 may effectively replace the inductor 244 in addition to ensuring operational safety. Meanwhile, the switching circuitry, such as the controller 250 working in cooperation with the feedback regulator 246, may generate PWM pulses in the same manner as in the embodiment of FIG. 8 irrespective of whether the power is supplied to the inductor 244 or the isolation transformer 355. The transformer coils wired to a circuit side 357 of the scavenging device 350 may be used to accumulate electric current when the switch pin 252 is switched to the ground pin 258 while inducing the opposite current in the coils connected to a load side 359. In other words, the isolation transformer 355 may be regarded as an inductor with an additional function of an electrostatic shield.

Referring back to FIG. 8, there is a direct discharge path from the output 222 back to the input 218 in a fault condition caused by the shorting of the flyback diode 260. Additionally, the internal circuitry of the controller 250 may similarly create a virtually resistance-free path between the output 222 and the input 218. By contrast, the isolation transformer 355 in the embodiment illustrated in FIG. 11 prevents the energy from being transferred back to the input 218. As one skilled in the art will recognize, an isolation transformer may be considered fail-safe for all practical purposes as long as the proper transformer with the corresponding core saturation characteristics is selected.

Further, the coil ratio of the isolation transformer 355 may be selected to additionally provide a voltage transformation desirable in certain applications. Thus, rather than using additional circuitry to regulate the voltage supplied to the power load, the isolation transformer 355 may provide an efficient means of controlling the output voltage. Moreover, a transformer may be constructed with multiple windings in order to provide multiple outputs, if required in a particular application.

It will be further recognized that it may not be necessary to maintain absolute isolation between the supply circuit side 357 and the load side 359. In particular, feedback voltage or power signals may be supplied from the load side 359 to the supply side 357 for reference or additional regulating purposes as long as the connections across the isolation boundary include adequately sized infallible resistors. Also, it may be necessary to limit the power transferred through the transformer in the forward direction, or in the direction from the supply side 357 to the load side 359. These limitations can help achieve the desired limits on the power transfer in the opposite direction. Although elements performing these functions are not shown in FIG. 11, it will be noted here that these forward limitations may be achieved by a shunt regulator connected at the input to the transformer on the supply side 357.

With continued reference to FIG. 11, clamp diodes 362 may be additionally connected across the input terminals 218 to limit the voltage at the input of the power scavenging device 350 in order to establish a maximum voltage in fault conditions for I.S. purposes. One skilled in the art will recognize that the clamp diodes 362 have no effect on the scavenging device 350 in normal operating modes of the device 350.

Figure 12:
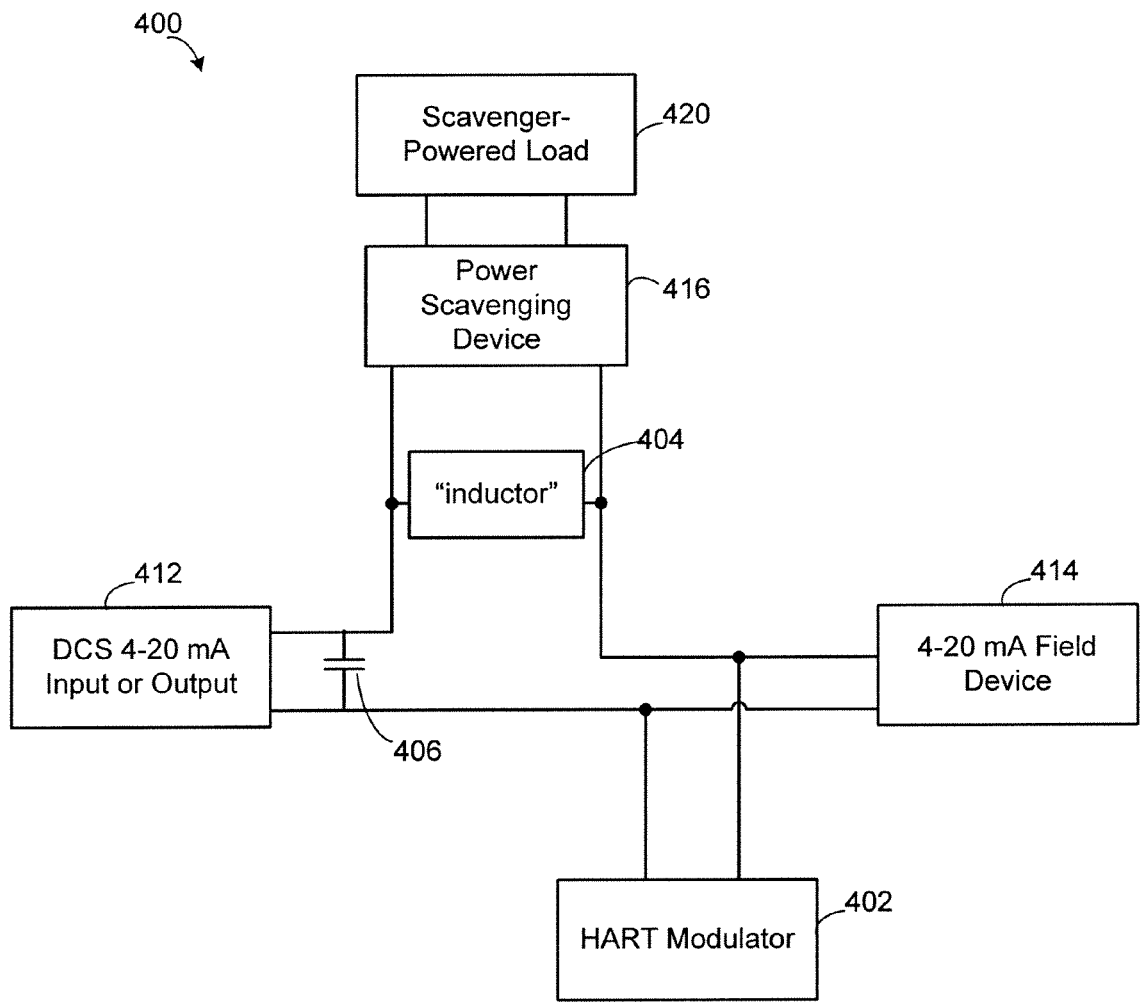
FIG. 12 is a schematic representation of an input regulated DC to DC converter with integral filtering characteristic.

FIG. 12 illustrates another embodiment of a power scavenging device using an input regulated DC to DC converter. Here, a current loop 400 includes a HART communicator 402 in addition to the DCS 212 and the field device 214 discussed above in reference to FIG. 6. The HART modulator 402 is connected across in parallel with the field device 214 in order to modulate voltage across the field device. As is known in the art, the ability to modulate voltage across a circuit depends on the impedance of the circuit. In particular, low impedance of the circuit requires a modulating circuit to spend a large amount of energy. Meanwhile, the DCS 212 could be a battery with a very low impedance and thus a typical 4-20 mA current loop is not conducive to HART communications. It is therefore desirable to increase the impedance of the loop 400. Moreover, it is desirable to meet this objective without using such conventional means as an inductor because an inductor would shunt the usable power. Thus, while it may be possible to increase the impedance of the loop 400 with an inductor, it may not be possible to scavenge enough power from the loop 400 in order to power the HART communication circuit 402.

In accordance with an embodiment illustrated below, the power scavenging device 216, in addition to providing power to the load 220, appears as a virtual inductor 404 connected in series with the field device 214. The virtual inductor 404 is not a physical device separate from the power scavenging device 216. Rather, a particular embodiment of the scavenging device 214 presents the device 214 to the circuit 400 as an inductor so that the HART communicating circuit 402 may modulate signals over the wires of the circuit 400. Additionally, a capacitor 406 provides a filtering function in order to smooth out the sudden changes in current which may interfere with HART communications.

Figure 13:
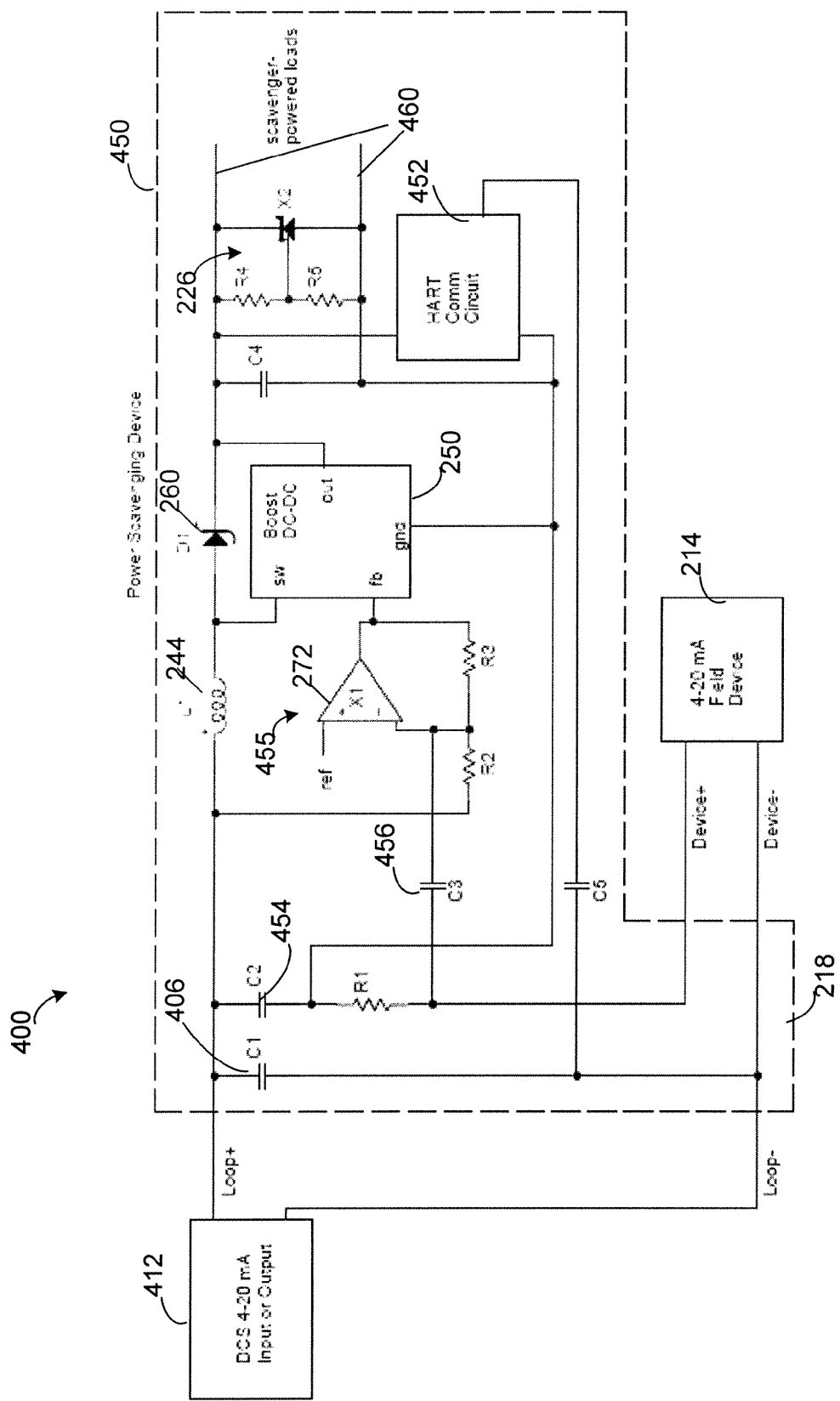
FIG. 13 is an electrical diagram of an input regulated DC to DC converter with integral filtering characteristic including a HART communication circuit.

A power scavenging device 450 schematically illustrated in FIG. 13 operates in such a way as to control the rate of change of current through the power scavenging device 450 thereby creating AC impedance. Additionally, the power scavenging device 450 reduces the noise level and ensures that the circuit 400 is conducive to voltage modulation and, in particular, to HART communications. As illustrated in FIG. 13, the power scavenging device may power a HART communication circuit 452 and may, in this particular embodiment, include the HART communication circuit 452 as an integral component.

As illustrated in FIG. 13, the capacitor 406 is connected in parallel with the field device 214 in order to filter out the loop noise. However, the capacitor 406 need not be part of the scavenging device 450 and may be provided separately, as illustrated in FIG. 12. Additionally, an input noise filter 454 is connected in series with the DCS 212 and the field device 214. Similarly to other embodiments discussed herein, the selection of the input noise filter 454 is a function of the operating frequency of the controller 250 as well as of the allowable noise amplitude at the input terminals 218. For example, a 1 µF capacitor may be used as the input filter 454 in a 4-20 mA circuit loop with the allowable voltage drop of ~1V and the voltage output to a scavenger load of ~3V. One skilled in the art will appreciate, however, that the input filter 454 in this and other embodiments may also be considerable larger.

The feedback circuit 455 functions in a manner largely similar to the operation of the feedback circuit 246 illustrated in FIG. 8. However, the feedback circuit 455 additionally includes a capacitor 456, effectively coupling a signal indicative of the current entering the scavenging device 450 to the inverting input of the amplifier 272. This configuration provides a dynamic characteristic of limiting the rate of change of a current 458 through the scavenging device 450 and into the field device 214. Additionally, the combination of the energy storage in the capacitor 406 and the limited rate of change of current through the scavenging device 450 provides the filtering function which can isolate the communication of the HART communication circuit 452. The limited rate of change of the current 458 through the scavenging device 450 additionally functions as a series impedance for the loop current.

The power scavenging device 450 may be further improved by clamping the voltage at the input terminals of the device 450 by means of a breakdown diode, for example. Moreover, an isolation transformer similar to the transformer 355 illustrated in FIG. 11 may be used in place of the inductor 244 to provide I.S. energy limiting. The isolation transformer used in place of the inductor 244 may further include a coil configuration suitable for adjusting the output voltage. One skilled in the art will appreciate that various aspects of the embodiments illustrated in FIGS. 6-13 may be combined to achieve various application goals.

Additionally, the scavenging device 450 may provide multiple outputs and may maintain each output voltage at a different level by using shunt regulators, for example. FIG. 13 illustrates a typical configuration of the shunt regulator 226 which dissipates excess power provided to a power load connected to an output terminal pair 460. Because an input regulated DC to DC converter harvests the available power at a given input and at a regulated voltage drop, additional voltage regulators may be required to provide regulated voltage to scavenger-powered loads. It is contemplated that the embodiment illustrated in FIG. 13 may provide power to a radio transceiver as well to as to a HART communication circuit. Additionally, the excess power may be stored in a power storage device, such as the device 224, instead of being dissipated by a shunt regulator.

It is further contemplated that the filter function of the scavenging device 450 may be selectable. By being able to turn off the filtering functionality when it is not required, users of the device may find additional applications for a scavenging device discussed herein.

Thus, as discussed above, the input-regulated DC to DC converter of at least some of the embodiments maintains a substantially constant voltage drop across the input terminals and directs the power available at the controlled voltage drop to a pair of output terminals. Depending on the characteristics of the circuit including such input-regulated DC to DC converter, the voltage at the output terminals of the input-regulated DC to DC converter may vary during operation and, in some applications, the variation may not be predictable to a load powered by the input-regulated DC to DC converter.

Figure 14:
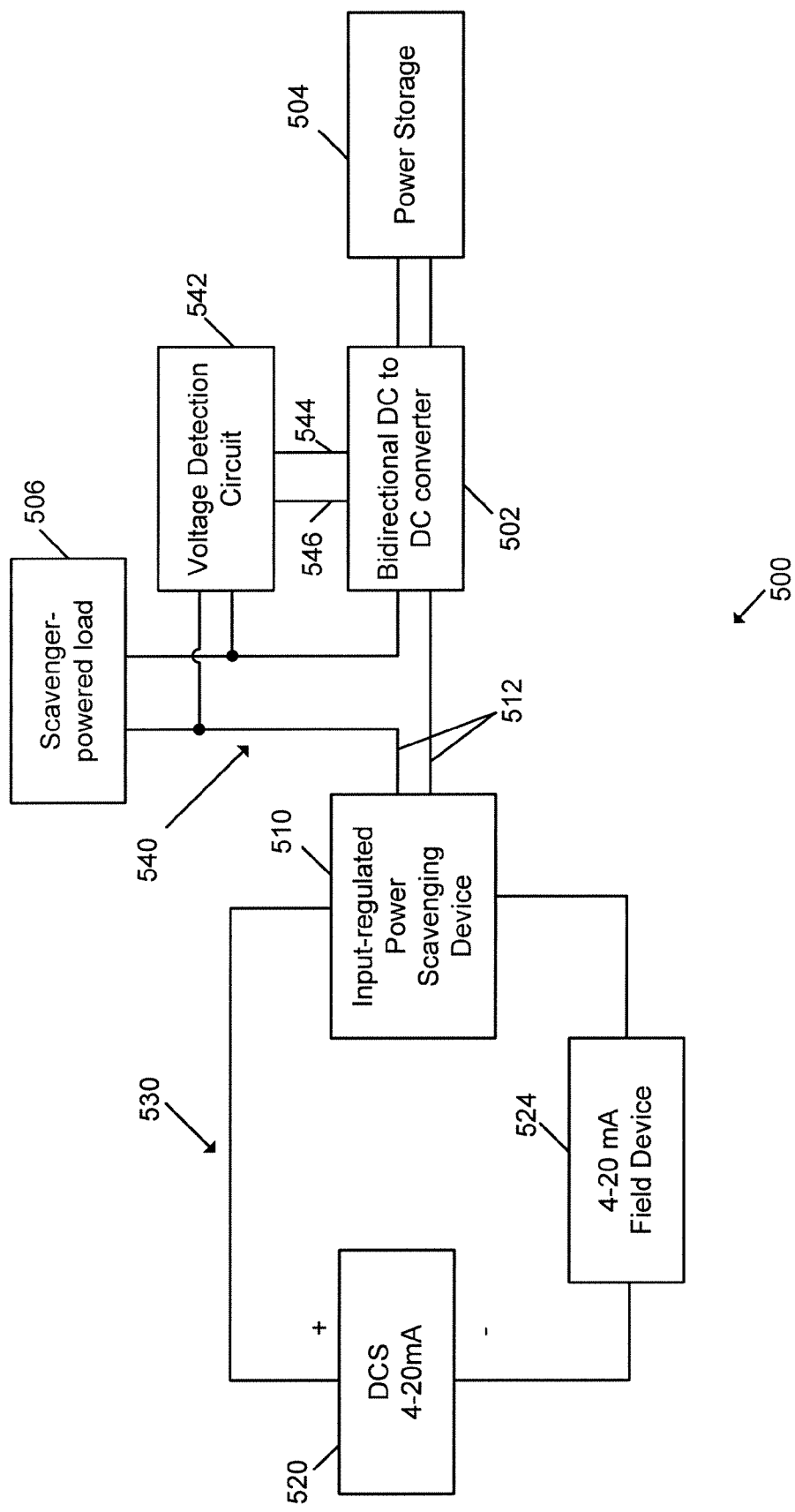
FIG. 14 is a schematic representation of a circuit in which a bidirectional DC to DC converter works in co-operation with an input-regulated DC to DC converter and a voltage regulation circuit.

As one example, FIG. 14 schematically illustrates a circuit 500 in which a bidirectional converter 502 regulates power transfer between a storage device 504 and a constant-voltage load 506 powered by an input-regulated power scavenging device 510 producing unregulated voltage across a pair of output terminals 512. In this example, the circuit 500 includes a 4-20 mA control loop in which a DCS 520 and a field device 524 communicate via 4-20 mA signals. The input-regulated power scavenging device 510 is connected in series with the field device 524 to form a current loop 530 including the DCS 520, the field device 524, and the power scavenging device 510. In operation, the power scavenging device 510 harvests excess power available in the current loop 530 while regulating the voltage drop across the input terminals of the power scavenging device 510. In some embodiments, the power scavenging device 210 may maintain a substantially constant voltage drop in order not to disrupt signaling in the loop 530. Because the current in the loop 530 may vary in the 4-20 mA range, the power scavenging device 510 may draw variable amounts of power available in the loop 530 and provide the available power at a non-constant voltage at the output terminals 512. However, the load 506 powered by the scavenging device 510 may require constant voltage to operate. While it may be possible to connect the output terminals 512 of the power scavenging device 510 to an adjustable shunt regulator to dissipate excess power and thereby maintain a constant voltage for a power scavenger-powered load 506, shunt regulators and other means of disposing of extra energy clearly lack efficiency.

On the other hand, the bidirectional DC to DC converter 502 connected in series with the output terminals 512 of the input-regulated power scavenging device 510 and with the load 506 may, at different stages of operation, either efficiently harvest power when excess power is available in a loop 540 (defined by at least the three modules 502, 506, and 510), or compensate for power deficiencies in the loop 540 by redirecting power from the power storage 504 to the load 506. To this end, the bidirectional DC to DC converter 502 may operate in a manner similar to the operation of the bidirectional DC to DC converter 16 discussed above, for example.

Additionally, a voltage detection circuit 542 may control the operation of the bidirectional DC to DC converter 502 by measuring the voltage drop across the load 506 and accordingly supplying control signals to the bidirectional DC to DC converter 502 via control lines 544 and 546. In some embodiments, the voltage detection circuit 542 may be similar to the circuit 102 discussed above with reference to FIG. 3. Alternatively, the voltage detection circuit 542 may be integral to the load 506 so that the load 506 may effectively control the direction and amount (e.g., as PWM timing) of power transfer through the bidirectional DC to DC converter 502. In either case, the bidirectional DC to DC converter 502 may transfer power to the power storage 504 when the voltage detection circuit 542 reports a voltage drop in excess of a certain high threshold and, conversely, from the power storage 504 when the voltage detection circuit 542 reports a voltage drop below a certain low threshold.

Figure 15:
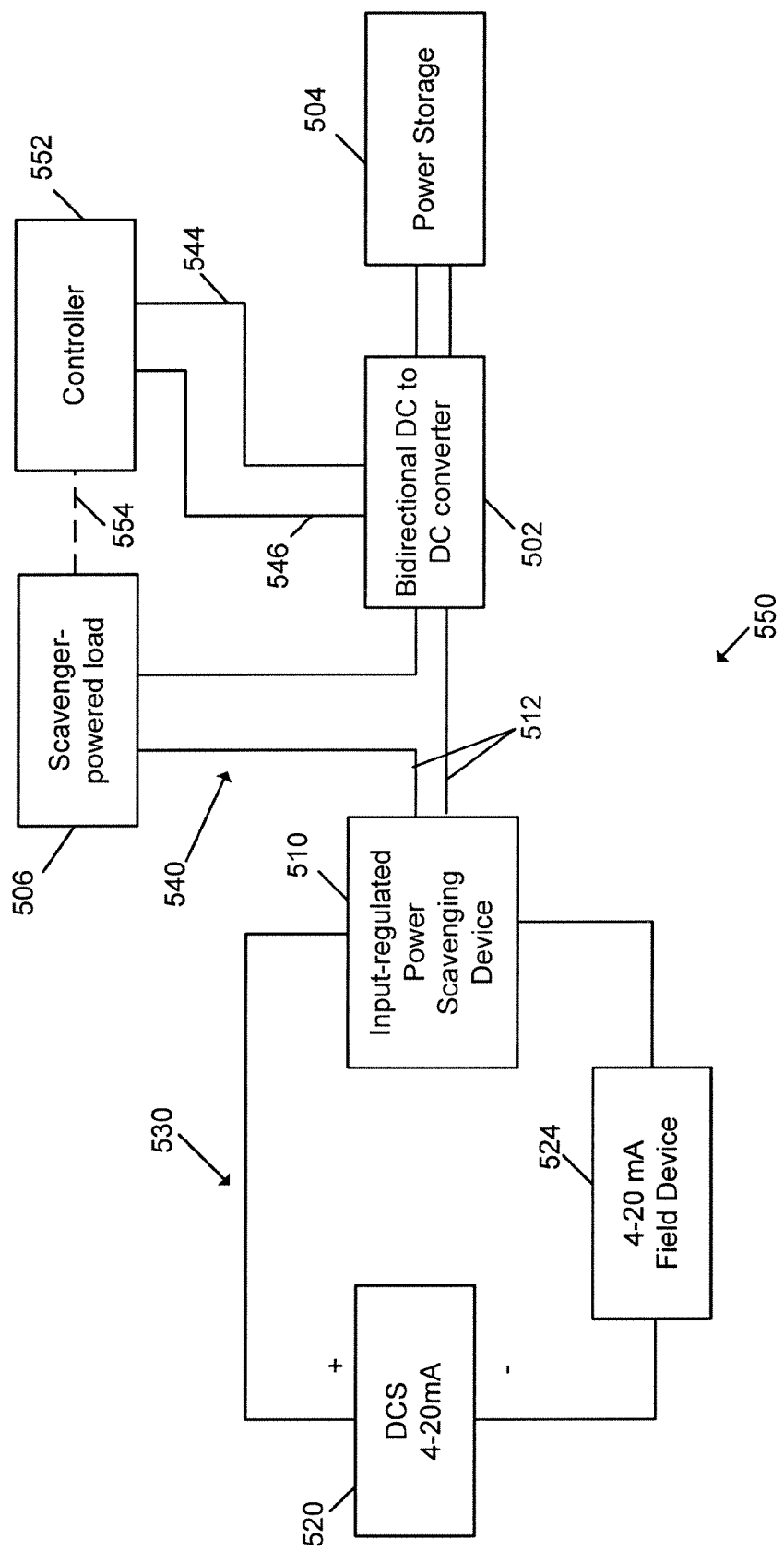
FIG. 15 is a schematic representation of a circuit in which a bidirectional DC to DC converter works in co-operation with an input-regulated DC to DC converter and an intelligent controller.

Referring to FIG. 15, a circuit 550 is similar to the circuit 500 discussed above. However, rather than relying on the voltage detection circuit 542, the circuit 550 includes an intelligent controller 552 which communicates with the load 506 and regulates, via control lines 544 and 546, the direction and amount of power transfer through the bidirectional DC to DC converter 502. In one embodiment, the intelligent controller 552 and the load may communicate via a standard RS-232 connection to exchange messages according to an appropriate communication protocol. By processing messages from the load 506, the controller 552 may increase or decrease the width of PWM pulses, reverse the direction of power transfer, and otherwise regulate the circuit 540 via the control lines 544 and 546.

It will be appreciated that the circuit 550 may optionally include a voltage detection circuit 542 which may report voltage measurements to the controller 552, for example. Further, it is contemplated that some of the components discussed above may be combined to simplify housing and packaging, for example. In one such contemplated embodiment, a bidirectional DC to DC converter 16 or 502 may include a supercapacitor or another type of power storage unit.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A bidirectional DC to DC converter having a first operational mode and a second operational mode, comprising:
    a first terminal pair that connects the converter to a first electric circuit having a power source, the first terminal pair including a positive terminal and a negative terminal;
    a second terminal pair that connects the converter to a second electric circuit, the second terminal pair including a positive terminal and a negative terminal;
    an accumulation element for temporary accumulation of electric energy; and
    a switching circuit connected to the first terminal pair, the second terminal pair, and the accumulation element, wherein
    electric energy is transferred from the first electric circuit to the second electric circuit via the accumulation element in the first operational mode, wherein the switching circuit maintains a controlled voltage drop across the first terminal pair to harvest electric energy from the first electric circuit available at the controlled voltage drop; and
    electric energy is transferred from the second electric circuit to the first electric circuit via the accumulation element in the second operational mode.

2. The converter of claim 1, wherein the accumulation element includes an inductor.

3. The converter of claim 1, wherein the switching circuit includes:
    a first switching element having a first operational state and a second operational state; wherein
    the first switching element electrically connects the positive terminal of the first terminal pair to a first terminal of the accumulation element to cause accumulation of electric energy in the accumulation element in the first operational state of the first switching element;
    and wherein the first switching element electrically disconnects the positive terminal of the first terminal pair from the accumulation element to cause transfer of electric energy from the accumulation element in the second operational state of the first switching element;

wherein a second terminal of the accumulation element is electrically connected to the positive terminal of the second terminal pair so that the electric energy is transferred through the positive terminal of the second terminal pair in the second operational state of the first switching element.

4. The converter of claim 3, wherein the first switching element is a Metal Oxide Semiconductor Field Effect Transistor (MOSFET).

5. The converter of claim 3, wherein the switching circuit further includes:
a second switching element having a first operational state and a second operational state; wherein
the second switching element electrically connects the first terminal of the accumulation element to the negative terminal of the first terminal pair to cause accumulation of electric energy in the accumulation element in the first operational state of the second switching element; and wherein the second switching element electrically connects the first terminal of the accumulation element to the positive terminal of the first terminal pair to cause transfer of electric energy from the accumulation element to the positive terminal of the first terminal pair in the second operational state of the second switching element.

6. The converter of claim 3, wherein the switching circuit further includes:
a first diode that permits a flow of electric current only in a direction from the first terminal of the accumulation element to the positive terminal of the first terminal pair; and
a second diode that permits a flow of electric current only in a direction from the negative terminal of the first terminal pair to the first terminal of the accumulation element.

7. The converter of claim 3, wherein the switching circuit further includes:
a first capacitor electrically connected across the first terminal pair; and
a second capacitor electrically connected across the second terminal pair.

8. The converter of claim 1, wherein the controlled voltage drop across the first terminal pair is a first voltage drop, wherein the second terminal pair is associated with a second voltage drop; and wherein the first voltage drop is larger than the second voltage drop in the first operational mode of the device and smaller than the second voltage drop in the second operational mode of the device.

9. A method of regulating bidirectional power transfer between a first circuit and a second circuit, wherein the first circuit includes a power source and the second circuit does not include a power source, the method comprising:
transferring electrical power from the first circuit to the second circuit in accordance with availability of excess power in the first circuit in a first operational mode, including:
accumulating power from the first circuit in an accumulation element, and
transferring power from the accumulation element to the second circuit; and
transferring electrical power from the second circuit to the first circuit in a second operational mode in accordance with lack of power in the first circuit, including:
accumulating power from the second circuit in the accumulation element; and
transferring power from the accumulation element to the first circuit.

10. The method of claim 9, wherein transferring electrical power from the first circuit to the second circuit includes alternating the acts of accumulating power from the first circuit in an accumulation element and transferring power from the accumulation element to the second circuit in accordance with a Pulse Width Modulation (PWM) scheme.

11. The method of claim 10, wherein transferring electrical power from the first circuit to the second circuit further includes varying pulse width according to an amount of unused power available at the first circuit, including increasing pulse width when more power is available at the first circuit.

12. The method of claim 10, wherein alternating the acts of accumulating power and transferring power includes operating an electronic switch including a transistor.

13. The method of claim 9, wherein transferring electrical power from the second circuit to the first circuit includes alternating the acts of accumulating power from the second circuit in an accumulation element and transferring power from the accumulation element to the first circuit in accordance with a Pulse Width Modulation (PWM) scheme.

14. The method of claim 13, wherein transferring electrical power from the second circuit to the first circuit further includes varying pulse width according to an amount of insufficient power required by the first circuit, including increasing pulse width when more power is required by the first circuit.

15. The method of claim 9, wherein the accumulation element is an inductor.

16. The method of claim 9, wherein the first circuit includes a power source and a power load; and wherein the accumulation element is a component of a bidirectional DC to DC converter; the method further comprising:
connecting the bidirectional DC to DC converter in series with the power source and the power load;
measuring a voltage drop across the power load to generate a voltage measurement; and
selecting between the first operational mode and the second operational mode based on the voltage measurement.

17. The method of claim 9, wherein the first circuit includes a power source and a power load; and wherein the accumulation element is a component of a bidirectional DC to DC converter; the method further comprising:
receiving a first signal to control the first operational mode;
receiving a second signal to control the second operational mode;
operating a first electronic switch according to the first signal; and
operating a second electronic switch according to the second signal; wherein
the first electronic switch and the second electronic switch are components of the bidirectional DC to DC converter.

18. A system for scavenging power in a first circuit having a power source variable DC current, comprising:
an input-regulated power scavenging device, including:
an input terminal pair connecting the scavenging device to the first circuit; and
an output terminal pair connecting the scavenging device to a second circuit;
a storage device for storing electrical power; and
a bidirectional DC to DC converter connected to the second circuit and to the storage device, wherein the bidirectional DC to DC converter transfers power from the second circuit to the storage device in a first operational mode and from the storage device to the second circuit in the second operational mode, and wherein the input-regulated power scavenging device maintains a controlled voltage drop across the input terminal pair and harvests electrical energy from the first circuit available at the controlled voltage drop.

19. The system of claim 18, wherein bidirectional DC to DC converter includes:
an inductor; and
a switching circuit coupled to the inductor to periodically accumulate electrical power in the inductor in the first operational mode of the DC to DC converter and in the second operation mode of the DC to DC converter.

20. The system of claim 18, wherein the storage device is a supercapacitor.

21. The system of claim 18, further comprising a scavenger-powered load connected to the second circuit that draws power from the power scavenging device in the first operational mode of the bidirectional DC to DC converter and from the storage device in the second operational mode of the bidirectional DC to DC converter.

22. The system of claim 21, further comprising a voltage detection circuit that measures voltage across the scavenger-powered load; the voltage detection circuit including:
a first control line coupled to the bidirectional DC to DC converter that controls transfer of electrical power from the second circuit to the storage device; and
a first control line coupled to the bidirectional DC to DC converter that controls transfer of electrical power from the storage device to the second circuit.

23. The system of claim 21, further comprising a controller communicatively coupled to the scavenger-powered load and to the bidirectional DC to DC converter, wherein the controller regulates transfer of electrical power between the storage device and the second circuit based on signaling between the controller and the scavenger-powered load.

24. A method of regulating a bidirectional transfer of electrical power between a source circuit having a power source and a power storage circuit using a current accumulation element, the method comprising:
detecting a power demand of the first circuit, wherein the first circuit is associated with variable DC current;
if the detected power demand is associated with excess power available in the first circuit:
regulating a first transfer of the excess power from the source circuit to the power storage circuit through the current accumulation element;
if the detected power demand is associated with insufficient power available in the source circuit:
regulating a second transfer of necessary power from the power storage circuit to the source circuit through the current accumulating unit.

25. The method of claim 24, wherein detecting the power demand of the source circuit includes processing a signal from a controller associated with the source circuit.

26. The method of claim 24, wherein detecting the power demand of the source circuit includes:
obtaining a voltage measurement associated with the source circuit;
obtaining a low threshold voltage of the source circuit, wherein the low threshold voltage is lower than an operating voltage associated with the source circuit;
obtaining a high threshold voltage of the source circuit, wherein the high threshold voltage is higher than the operating voltage associated with the source circuit;
comparing the voltage measurement to the low threshold voltage and to the high threshold voltage; and
regulating the second transfer of electrical power if the voltage measurement is lower than the low threshold voltage and regulating the first transfer of electrical power if the voltage measurement is higher than the high threshold voltage.

* * * * *